US009645628B1

(12) United States Patent
Loafman et al.

(10) Patent No.: US 9,645,628 B1
(45) Date of Patent: May 9, 2017

(54) COMBINED DATA STORAGE AND COMPUTING APPLIANCE THAT PROVIDES SCALABLE STORAGE IN A CLUSTERED COMPUTING ENVIRONMENT

(75) Inventors: Zachary Merlynn Loafman, Seattle, WA (US); Frank Charles Paterra, Kirkland, WA (US); Deepak Sunny Veliath, San Jose, CA (US); John Thomas Cardente, Milford, MA (US); John Forecast, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 144 days.

(21) Appl. No.: 13/287,901

(22) Filed: Nov. 2, 2011

Related U.S. Application Data

(60) Provisional application No. 61/484,193, filed on May 9, 2011.

(51) Int. Cl.
| | |
|---|---|
| G06F 15/173 | (2006.01) |
| G06F 1/32 | (2006.01) |
| G06F 9/50 | (2006.01) |

(52) U.S. Cl.
CPC .......... *G06F 1/3206* (2013.01); *G06F 1/3209* (2013.01); *G06F 1/3212* (2013.01); *G06F 9/5061* (2013.01); *G06F 9/5077* (2013.01)

(58) Field of Classification Search
CPC ............ H04N 19/00206; G06F 1/3206; G06F 1/3209; G06F 1/3212; G06F 9/5061; G06F 9/5077
USPC ................................................. 709/223–226
See application file for complete search history.

(56) References Cited

U.S. PATENT DOCUMENTS

| | | | |
|---|---|---|---|
| 7,424,710 B1 | 9/2008 | Nelson et al. | |
| 2002/0103663 A1* | 8/2002 | Bankier et al. | 705/1 |
| 2005/0039180 A1 | 2/2005 | Fultheim et al. | |
| 2006/0047813 A1* | 3/2006 | Aggarwal et al. | 709/226 |
| 2006/0294238 A1* | 12/2006 | Naik et al. | 709/226 |
| 2008/0263324 A1* | 10/2008 | Sutardja et al. | 712/43 |
| 2008/0313331 A1* | 12/2008 | Boykin et al. | 709/226 |

(Continued)

OTHER PUBLICATIONS

Mason (Mason, Rob, What's the Cost of a GB in the Cloud?, The Nasuni Cloud Storage Blog, Nasuni Corporation, Sep. 27, 2010, pp. 1-2, retrieved on Sep. 21, 2015 from http://www.nasuni.com/57-whats_the_cost_of_a_gb_in_the_cloud/).*

(Continued)

*Primary Examiner* — Tauqir Hussain
*Assistant Examiner* — Michael A Keller
(74) *Attorney, Agent, or Firm* — Krishnendu Gupta

(57) ABSTRACT

Various embodiments are directed toward improving computing performance for data intensive computing applications by arranging a physical machine into a single computing appliance that includes tightly coupled dedicated computation and storage resources that may scale to multiple peta-byte or greater storage in concert with providing a similarly scaling computing and data caching platform, monitoring co-resident guest applications, and data access applications. Generally, the computing appliance may be arranged to execute compute applications and data storage applications in a single self-contained computing device. The data storage applications may execute within virtual machines (VM's) and the compute applications may execute in other co-resident VM's residing one or more computing appliances.

15 Claims, 15 Drawing Sheets

(56) References Cited

U.S. PATENT DOCUMENTS

| | | | |
|---|---|---|---|
| 2009/0228892 A1* | 9/2009 | Di Luoffo et al. | 718/104 |
| 2009/0271510 A1* | 10/2009 | Goel et al. | 709/224 |
| 2009/0271807 A1* | 10/2009 | Barsness et al. | 719/330 |
| 2010/0058352 A1* | 3/2010 | Esfahany et al. | 718/105 |
| 2010/0268834 A1* | 10/2010 | Eidelman | H04L 12/2697 709/230 |
| 2011/0022812 A1 | 1/2011 | van der Linden et al. | |
| 2012/0131125 A1* | 5/2012 | Seidel et al. | 709/212 |

OTHER PUBLICATIONS

Official Communication in U.S. Appl. No. 13/287,866 mailed Jun. 4, 2013.

Official Communication in U.S. Appl. No. 13/287,866 mailed Oct. 23, 2013.

* cited by examiner

COMBINED DATA STORAGE AND COMPUTING APPLIANCE THAT PROVIDES SCALABLE STORAGE IN A CLUSTERED COMPUTING ENVIRONMENT

CROSS-REFERENCE TO RELATED APPLICATIONS

This application claims the benefit of U.S. Provisional Application Ser. No. 61/484,193 filed on May 9, 2011, entitled "Combined Data Storage and Computing Appliance that Provides Scalable Storage in a Clustered Computing Environment," the benefit of the earlier filing date of which is hereby claimed under 35 U.S.C. Section 119 (c) and 37 C.F.R Section 1.78, and is further incorporated herein by reference.

TECHNICAL FIELD

Various embodiments relate generally to managing computing resources for applications in a file system, and more particularly to, accelerating the computing of data intensive applications by reducing overhead among a plurality of processes.

BACKGROUND OF THE INVENTION

Modern high performance computing often requires computing tasks to be distributed and executed on separate computers. Often operators build and deploy computer hardware and software platforms optimized for particular types of computing tasks. For example, some computing tasks may be processor intensive, high-speed memory intensive, data intensive, communication intensive, or combination of the above. Computing tasks are often deployed on computing hardware that is arranged to complement the particular computing tasks they are intended to host. Such arrangements may include additional processors for processor intensive computing tasks, fast local memory and high speed local busses to support local memory intensive tasks, high-performance network interfaces for communication intensive computing tasks, and the like.

In addition, some computing tasks may have operational requirements that may vary during the course of execution. For example, a computing task may begin by retrieving a large amount of data requiring high performance data access, and then once the data has been pulled into local memory the computing task may become processor intensive as it begins to process the retrieved data collections, and so on. In such cases, it may be difficult to arrange a single computing device to optimally execute all phases of the computing task.

In some high performance applications, it may be desirable to execute computing tasks in virtual machines running on the same physical computer. Often the computing tasks in different virtual machines executing on the same physical computer are required to communicate and interact with each other. Even though the computing tasks are hosted on the same physical computer, performance may be hindered by communication and network overhead costs.

If communication and network overhead costs can be reduced, a computing platform can be provided that is significantly faster and more efficient.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE VARIOUS EMBODIMENTS

Figure 1:
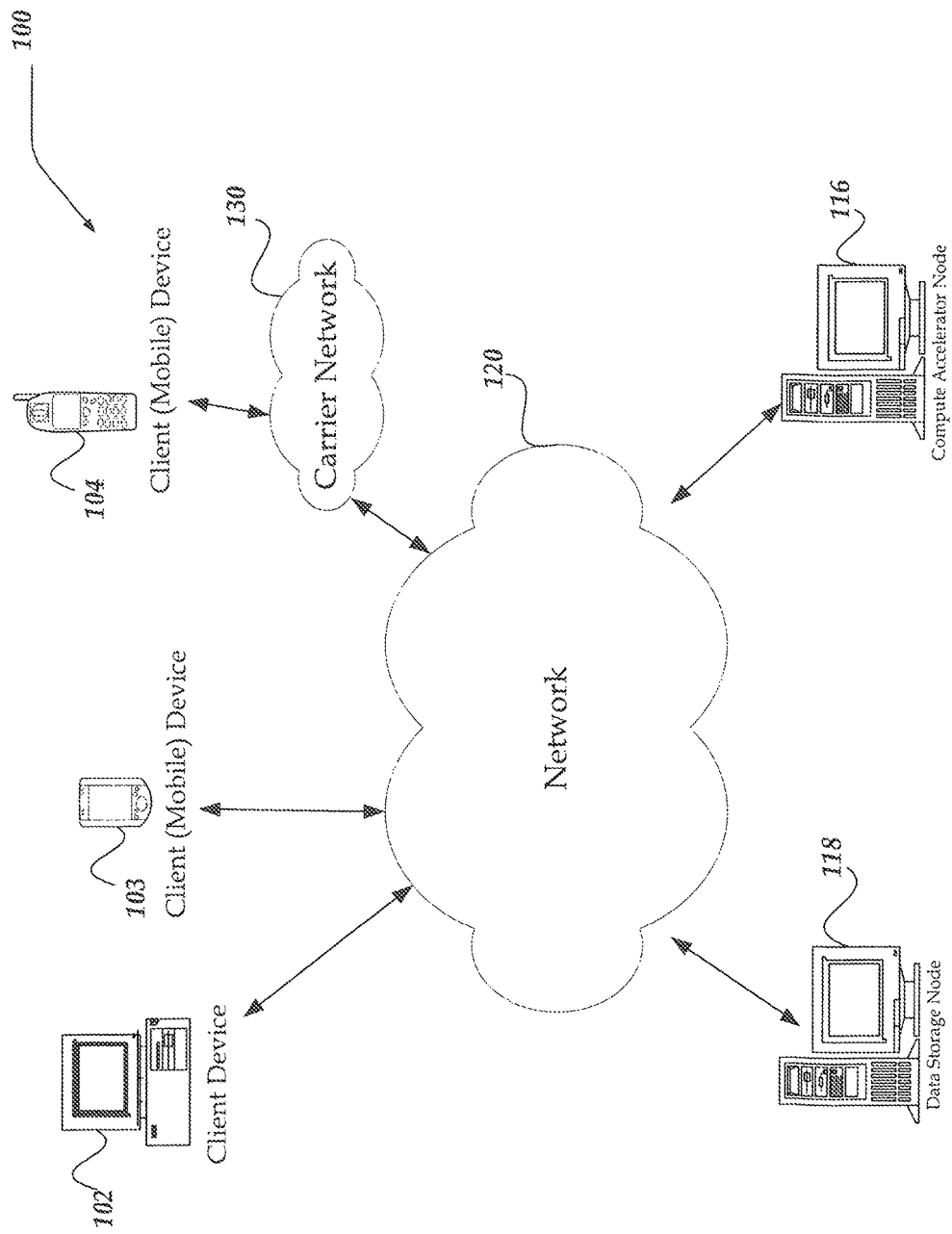
FIG. 1 illustrates an overview of a system in which various embodiments may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

Briefly stated, various embodiments are directed toward improving computing performance for data intensive computing applications by arranging a physical machine into a single computing appliance that includes tightly coupled dedicated computation and storage resources that may scale to multiple peta-byte or greater storage in concert with providing a similarly scaling computing and data caching platform, monitoring co-resident guest applications, and data access applications. Generally, the computing appliance may be arranged to execute compute applications and data storage applications in a single self-contained computing device. The data storage applications may execute within virtual machines (VM's) and the compute applications may execute in other co-resident VM's residing one or more computing appliances.

In at least one embodiment, the computing appliance may be arranged as a compute accelerator node computing appliance comprising computer hardware components and software that may be designed to support computationally intensive compute guest applications. In at least one of the various embodiments, such component may include, multiple multi-core processors, increased amount of memory (RAM), enhanced caches (SRAM), higher performance components, and the like. Also, compute intensive guest applications executing on a compute accelerator node appliance may have access to the distributed data storage network data through the high bandwidth low-latency network backplane interface.

In at least one embodiment, the computing appliance may be arranged to serve as a data storage node. In this case, the components are designed to maximize data storage performance. Such an arrangement may include, having multiple block storage devices, fast RAM, flash drives, high bandwidth low-latency network backplane interface, software dedicated to concurrent caching, and the like. Further, one or more data storage node computing appliances may be configured to allocate significant processor and computing resources to one or more data access applications to provide access to data storage that may be located in the data cluster. This arrangement may be advantageous to data storage guest applications that need to manage and respond to requests for data on a distributed data storage network.

In at least another embodiment, the computing appliance may be arranged into a hybrid node computing appliance configuration. In this case, the components in the computing appliance are arranged to provide balanced support for executing compute guest applications and data storage guest applications on the same appliance. Such an arrangement may include having a moderate amount block storage devices, software dedicated to concurrent caching, additional CPU's, additional memory, and the like. In some cases, this arrangement may be advantageous for compute guest applications that demand relatively low latency data results from a potentially smaller universe of data.

One of ordinary skill in the art will appreciate that the particular allocation and selection of hardware and software components in a computing appliance may vary depending on the operational requirements of the computing appliance and the distributed data storage cluster as a whole.

In at least one of the various embodiments, one or more computing appliances may be configured as a compute accelerator node computing appliance, data storage node computing appliance, or hybrid node computing appliance based in part on rule-based policy instructions for the respective computing appliance. Policy based instructions may define the allocation of physical and software resources that comprise the computing appliance. For example, in at least one of the various embodiments, policy instructions for a data storage node computing appliance may define a minimum threshold allocation of processor resources for the data access application(s) as, 75% with the remainder available for other guest applications. Likewise, policy instructions that define a compute accelerator node computing appliance may reserve only 20% of process resources to data access applications. One of ordinary skill in the art will appreciate that policy instructions may be arranged to support numerous embodiments, such as, policy instructions that may allocate 100% of a resource for use by data access applications, excluding all guest applications from a computing appliance—except for data access applications.

Compute guest applications may be migrated onto a computing appliance by employing hypervisor cluster management software. When determined by observation or through the operation of policy instructions, or a combination thereof, a compute guest application running in a VM may be migrated to a computing appliance that has adequate hardware and software resources. One of ordinary skill in the art will appreciate that hypervisor cluster management software is just one example of how a compute guest application may be migrated to an computing appliance. Other ways to migrate guest applications, include, automated pre-emptive process migration, OpenMOSIX cluster management, Beowulf cluster management, and the like.

Some guest applications may be at risk of becoming unstable during migration to and among computing appliances. If required, the operation of guest application may be suspended during the migration process to avoid the risk of the guest application becoming unstable. Further, the migration of guest applications onto, and between, computing appliances may be scheduled to occur at particular times. For example, policy instruction may enable guest applications to be migrated during off-peak operating hours to minimize disruption that may be caused by migrating the guest applications.

In at least one embodiment, guest applications may be characterized by an application profile that may be used to determine if the guest application is a compute intensive application, data storage application intensive, or a hybrid application. Application profiles may comprise properties such as, CPU utilization, processor utilization, disk access rate, disk access volume, resident memory size, virtual memory size, priority, number of threads, network utilization, data access rate, data access volume, and the like.

In at least one of the various embodiments, a compute intensive application profile may include high utilization of processors, high disk access, and a large resident memory footprint, and the like. Compute intensive application profiles may reflect that the corresponding applications require substantial access to local computing appliance hardware resources. Whereas, a data storage intensive profile may include substantial non-local data storage access. And, a hybrid profile may be a mix, or blend of compute intensive profiles and data storage intensive profiles. The particular profile property values and thresholds may be determined by policy instructions that define specific values for the set of properties used in the profiles. It should be clear to one of ordinary skill in the art that application profiles may be configured in many ways to meet to the requirements of a particular circumstances.

In at least one of the various embodiments, guest applications may be monitored by one or more system processes that "profile" the behavior of the application. In some case, the monitoring process may be in the form a hypervisor that may be monitoring managed virtual machines. In other cases, one or more process may be monitoring the guest applications to determine the guest applications profile. After a guest application profile has been determined an embodiment may be able to compare the guest application's determined profile with the predefined profile (e.g., compute intensive, data storage intensive, hybrid, and the like) to characterize the guest application. In addition, in at least one of the various embodiments, guest application profiles may be determined on an ad hoc basis based in part on an operator observing the performance profile of a guest application. For example, an operator may observe an application consumer a high level of CPU resources and determine by experience that the guest application should be classified as a compute intensive application. In other embodiments, guest applications may be assigned an application profile based on past performance.

In one embodiment, if a compute intensive guest application is executing on a physical machine that is not a node on a data storage cluster. Monitoring systems may indicate that the compute guest application is not operating efficiently because it is bandwidth bound because it is trying to pull too much data across the low-latency front-side network, the operator, or the hypervisor monitor, may choose to migrate the compute guest application directly onto a node of the distributed data cluster. The operator, or a computer program executing per policy instructions, may migrate the compute application onto a computing appliance that is part of the distributed data cluster. The particular computing appliance selected may depend on the application profile guest application. The operator, or a computer program executing per policy instructions, may select a compute accelerator node computing appliance, a data storage node computing appliance, or a hybrid node computing appliance.

In various embodiments, distributed data storage clusters may be built with one or more data storage nodes, one or more compute accelerator nodes, and one or more blended hybrid nodes. A data storage cluster may be interconnected by a high-bandwidth, low latency network backplane. Typically, compute processes accessing the distributed data storage cluster communicate through a high-latency, relatively low-bandwidth front side network connection, such as Ethernet, and the like.

Figure 2:
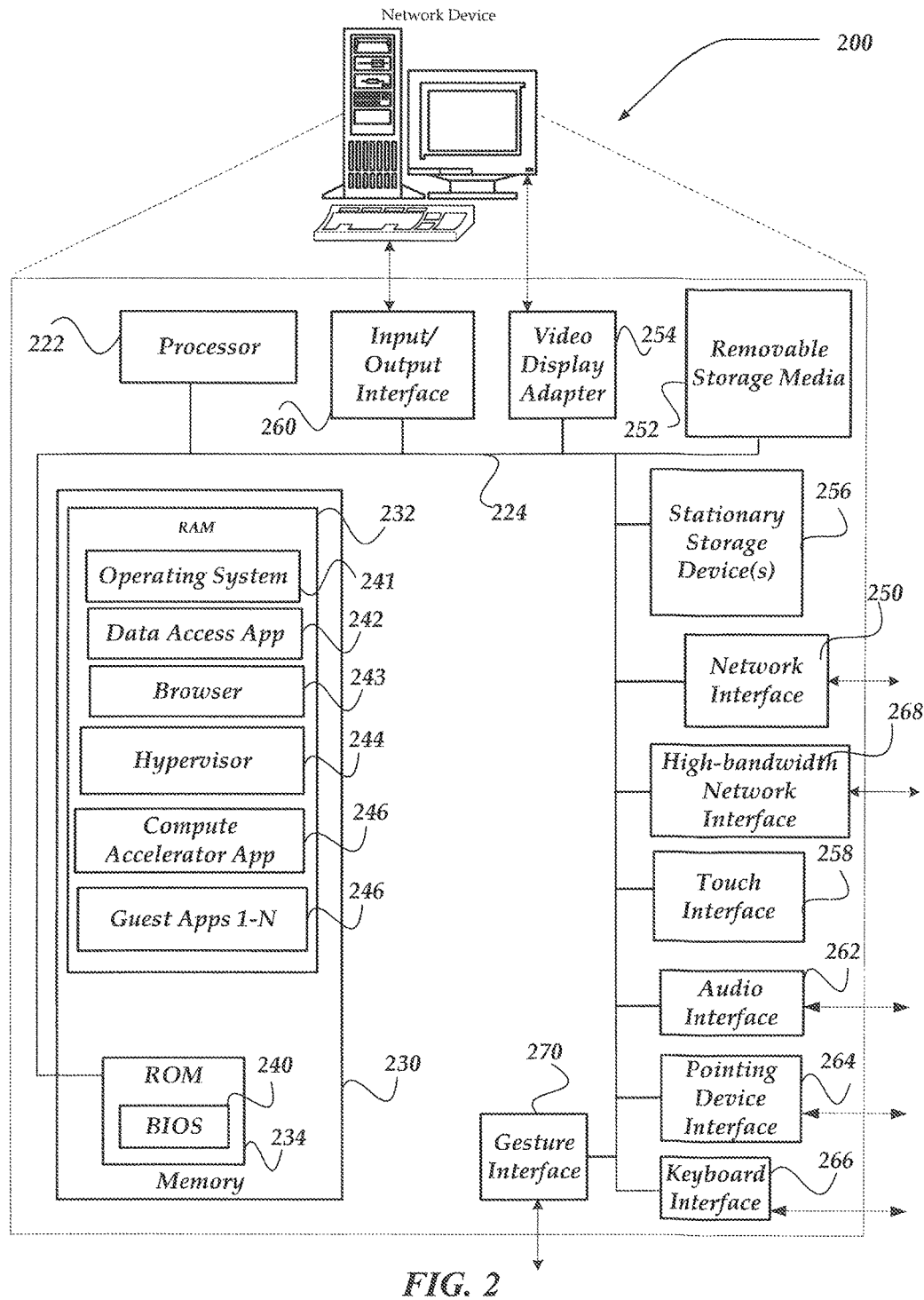
FIG. 2 shows an exemplary network device that may be arranged as compute accelerator node or a data storage node.
Figure 3:
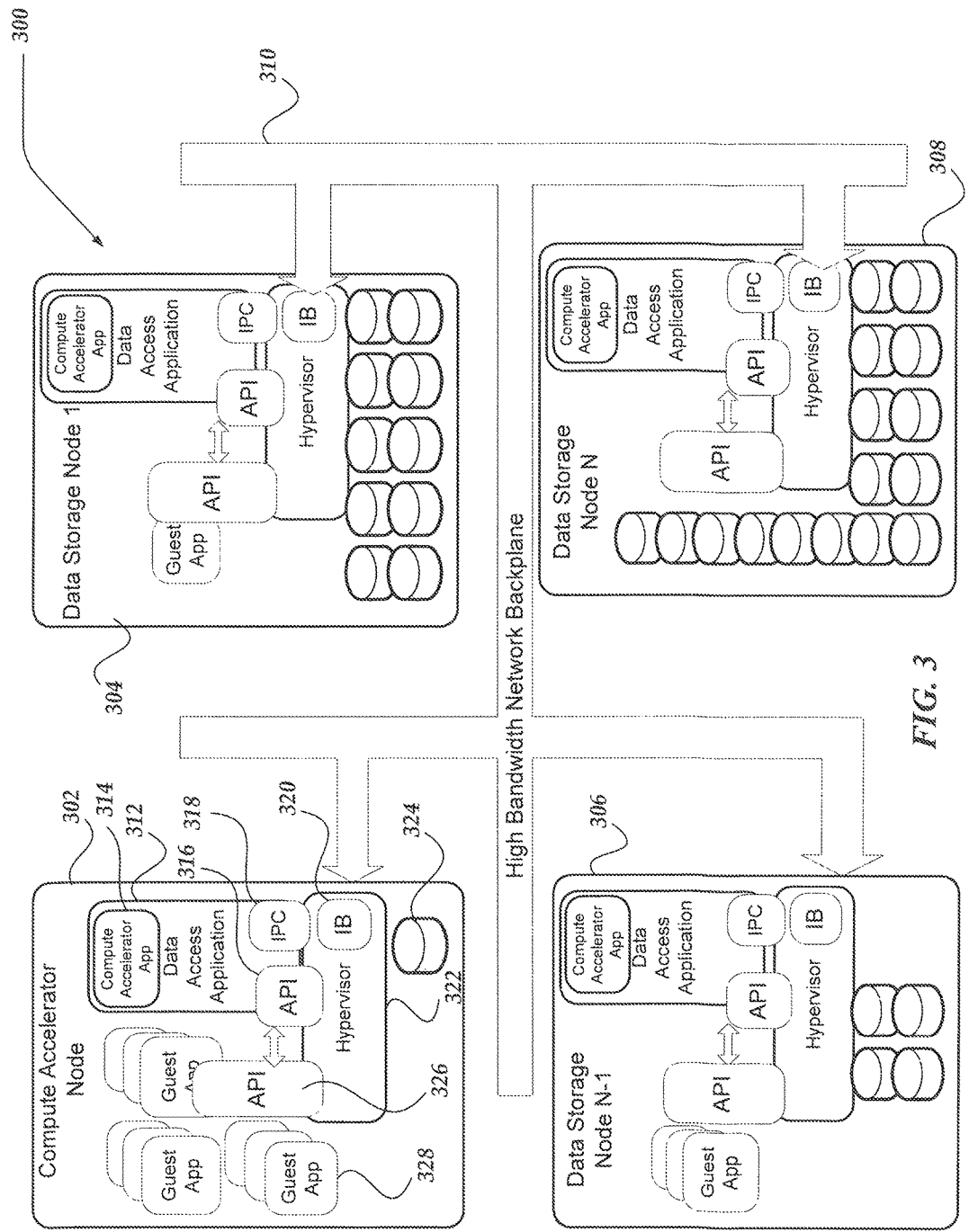
FIG. 3 illustrates an example of a system in which various embodiments of a compute accelerator node and data storage nodes that are coupled to each other over a high bandwidth network backplane.

In various embodiments, performance can be improved by moving guest applications onto the same physical machine as a distributed data access application. Since the physical machine that the data access application is on is connected to the data storage cluster's high-bandwidth network backplane, performance can be increased by reducing communication between guest applications executing on different nodes within the data storage cluster over a slow, relatively high latency network, such as Ethernet. Also, in various embodiments, different types of guest applications, such as data storage access applications and computing applications can be hosted in virtual machines ("VMs") running on the same physical machine (node) under the control of a hypervisor, such as, VMware, VirtualBox, Xen, and the like. Exemplary embodiments of physical machines (nodes) are shown in FIGS. 2 and 3.

A VM emulates the entire computer's resources, including its operating system that the guest application requires to execute. Typically, a VM for a guest application is instantiated with a complete communication networking stack, such as the Open System Interconnection (OSI) Reference Model, that connects to an abstract network interface provided by the hypervisor. Generally, guest applications executing in VMs are unaware that they are virtualized. Thus, if using communication protocols, the guest applications running in their corresponding VMs execute network protocol system calls as if they were actually going to communicate with each other over an external network, such as Ethernet. Likewise, on the receiving end of a request, the guest application executes through all of the layers of the network stack to decode and process incoming requests. In the past, if both the sending and receiving guest applications were running in VMs that were co-resident on the same physical machine (node), then computational resources employed to separately run through the entire communication networking stack for each guest application was wasted. Examples, of unnecessary computation include, high and low level protocol handshaking, packetizing the transaction at each level of the OSI stack, and the like. From the perspective of the physical machine hosting the VMs for the guest applications, each of the co-resident VMs are separate user space processes. Thus, communication among guest applications running within co-resident VM's can be improved by using faster inter-process communication protocols such as those on a high bandwidth low latency network, instead of relatively slower communication protocols for a relatively higher latency and lower bandwidth network such as Ethernet and the like.

In one embodiment, performance is improved by enabling the guest applications to run in co-resident VM's to transparently use low latency high speed inter-process communication mechanisms to communicate with other guest applications running in co-resident VM's. Guest applications running within the co-resident VM's may be not required to change system calls, or modify their code base any differently from what they would use for executing standard network communication protocols. For example, a guest application running in a co-resident VM can be unaware that another guest application it is targeting is running in a co-resident VM.

In at least one of the various embodiments, running guest applications and data access applications on the same physical hardware may accelerate data intensive computing by enabling the guest applications to communication directly with a data access application to access distributed data storage and avoid having to communicate via a low-latency front side network. However, the data access applications may not be starved of computing resources by other co-resident guest applications because starving the data access applications of resources may impair the performance of the entire distributed data storage cluster by reducing the data access application ability to service non-resident applications.

In at least one of the various embodiments, a data access application monitors process and system performance to ensure that enough processing and memory resources are available to maintain a level of operational performance to remain compliant with current policy instructions. In embodiments that host one or more co-resident applications in separate virtual machines a hypervisor may be present managing the virtual machines. Also, the data access application may monitor available resources and acquire or release computing, memory, peripheral, and network resources to maintain sufficient responsiveness to all clients (e.g., co-resident and non-resident client applications) based on current policy instructions. Further, a data access application may be arranged to receive a set of policy instructions from a management console or other user-interface, including command-line interface, graphical interface, web-based interface, and the like. The policy instructions may be used in part to determine the level of operational capacity and computing resources required by a data access application. In at least one of the various embodiments, policy instructions may contain instructions that are used to determine how to respond when policy instruction violations are detected.

In at least one of the various embodiments, a data access application may examine a guest application to determine whether the application is operating in compliance with the current policy instructions. For example, if a data access application detects that a guest application's deviates from the current policy instructions the data access application may trigger events that may cause the user interface to displaying warnings, or generate log messages, and the like. Further, the data access application may initiate actions that modify the allocation of computing resources including modifying the computing resources that are allocated to co-resident guest applications.

In at least one of the various embodiments, the monitoring of computing resource parameters may be enabled by software modules that interface with a hypervisor that manages co-resident VMs containing guest applications reside. In at least one of the various embodiments, one or more monitoring applications may use hypervisor supplied/supported API's that monitor the computer resources consumed by co-resident VM's. In at least one of the various embodiments, specialized extensions may be installed in/on the data access application VM to enable access to the physical machine and underlying operating system for monitoring and computing resource allocation. In at least one of the various embodiments, additional monitoring methods may be employed, such as, providing daughter processes that execute on the physical machine outside of the control of the hypervisor. These extensions may enable communication between the data access application and daughter processes that are arranged to monitor the performance and resource allocation on the physical machine.

In at least one of the various embodiments, a data access application operating within a hypervisor managed VM may communicate with a daughter process that is operating on the same physical machine but not under control or supervision of the hypervisor. The data access manager may be arranged to communicate with the daughter process using standard network communication techniques, such as TCP/IP, UDP, and the like. The data access application can send control messages to the daughter process and the daughter process may adjust and/or reallocate computer resources on the physical machine. Likewise, the daughter process may send status messages to the data access application containing information that may not otherwise be available to a VM resident application, such as, reports about the physical machine status, operating system status, and the like.

In at least one of the various embodiments, when co-resident guest applications and data access application are not inside hypervisor managed VM's the data access application may have direct access to the monitoring facilities of the host physical machine. In embodiments that do not rely on a hypervisor the data access application may use daughter processes or may directly monitor system performance using operating system facilities and system calls.

It should be appreciated that one of ordinary skill in the art may implement a variety of physical machine and process monitoring arrangements, the details of which need not be described herein. Generally, any service or process that enables a monitoring process to examine the computing resources consumed and/or allocated to other running processes should enable one of ordinary skill in the art to create sufficient monitoring systems.

In at least one of the various embodiments, if the current data access application policy instructions indicate that a reallocation of computing resources is required the data access application may respond in a number ways based on the current policy instructions. In at least one of the various embodiments, the actions available in particular circumstances may be determined in part by the current policy instructions the data access application is operating under. In at least one of the various embodiments, reallocation of computing resources may include using hypervisor facilities to increase or decrease access to the physical machine's resources by taking action such as, allocating CPU slices among the VM's, allocating physical memory among the VM's, allocating network access among the VM's, and the like. Alternatively, in at least one of the various embodiments, if hypervisor facilities are insufficient, or a hypervisor is not present, the data access application may use other means such as directly allocating computing resource quotas at the process level on the physical machine, notifying one or more operators that computing resources require reallocation, sending messages/instructions to daughter processes that may be able to allocate the computing resources on behalf of the data access application, and the like.

In at least one of the various embodiments, a data access application may determine that other computing nodes within the data storage cluster are better suited to host a co-resident guest application. Based on the current policy instructions, or as directed by an operator, the co-resident guest application may be migrated to another physical machine within the data storage cluster. In at least one of the various embodiments, the target physical machine may be determined by the current policy instructions or based of directives provided by other controlling processes or nodes. Also, in at least one of the various embodiments, operators and/or administrators may issue directives to migrate guest applications to a particular node on the data storage cluster.

In at least one of the various embodiments, co-resident guest applications and data access applications may be operating in separate co-resident VM's managed by a hypervisor. If supported by the hypervisor, migration may be accomplished using available hypervisor facilities that can migrate the entire VM containing the guest application(s) to another physical machine rather than just migrating the guest application process. In some cases, migration may be accomplished without terminating or suspending the guest application. In other cases, the guest application may need to be suspended or stopped before migration may occur.

In at least one of the various embodiments, one or more co-resident guest applications may starve a data access application of processor resources. In this case, a guest application may begin executing a computationally intense process after having been recently migrated onto the same physical machine as the data access application. As the computational load of the guest application process increases, the guest application may demand more processor resources. At a certain point a data access application may determine that there is not enough processing resources available to meet the performance requirements set by the current policy instructions. Accordingly, the data access application may reduce processor resources available to the co-resident guest application. Reducing the processing resources available to a computationally intensive co-resident guest application may enable the data access application to continue to operate and provide services to the rest of the data cluster nodes as required by the current policy instructions.

In at least one of the various embodiments, one or more co-resident guest applications may starve a data access application of memory (RAM). In this case, a guest application may begin a memory intensive task and demands more resident and/or virtual memory. At a certain point the data access application may determine that there is not enough physical memory available to meet the performance requirements established by current policy instructions. As a result, the data access application may reduce and restrict the amount of physical memory available to the guest application enabling the data access application to operate and provide services to non-resident applications and the data cluster nodes at the level required by the current policy instructions.

In at least one of the various embodiments, a data access application may deliberately starve a co-resident guest application of memory (RAM). In this case, a guest application may be running on the same physical machine as the data access application when the data access application determines, based in part on current policy instructions, that more memory should be reserved/allocated for its own use. Accordingly, the data access application may reduce and restrict the amount of memory available to the co-resident guest application.

In at least one of the various embodiments, the data access application may purposely starve guest applications of processing cycles. In this case, a guest application may be running on the same physical machine as the data access application when the current policy instructions of the data access application may indicate that the data access application must increase the allocated/reserved processing resources for use by the data access application. The data access application determines based on current policy instructions the amount of processing resources should be reserved/allocated for its own use. Next, the data access application sets/resets the processing resource quotas for the guest application running on the same physical machine.

In at least one of the various embodiments, if as a result of reallocation of computing resources the guest application becomes starved for computing resources, it may indicate this condition using the hypervisor monitoring systems or other similar mechanisms.

Exemplary Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client device(s) 102, mobile (client) devices 103-104, network 120, carrier network 130, one or more Data Storage nodes 118, and one or more Compute Accelerator Nodes 116. Network 120 is in communication with and enables communication between each of the elements of system 100. Carrier network 130 further enables telephonic communication with wireless communication devices such as mobile device 104.

Client devices 102-104 may include virtually any computing device capable of receiving and sending a message over a network, and/or to and from another computing device. The set of such devices may include devices that typically connect using a wired communications medium such as personal computers, tablet computers, multiprocessor systems, microprocessor-based or programmable consumer electronics, network PCs, and the like. Further, client devices 102-104 may include any device that is capable of connecting via a wireless communication signal such as a personal digital assistant (PDA), pocket PC, wearable computer, portable computing device, tablet computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of these devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like. Client devices 102-104 may further include a voice over IP (VOIP) application that enables voice communication over network 120 separate from carrier network 130.

Network 120 is configured to couple one computing device to another computing device, enabling them to communicate. Network 120 is enabled to employ any form of medium for communicating information from one electronic device to another. Also, network 120 may include a wireless interface, and/or a wired interface, such as the Internet, Cloud Computing, and the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Carrier network 130 may include wireless interfaces, wireless forms of communication, and/or wireless links such as cellular networks, satellite links, Infra-Red, Micro-Wave links, Open Air Laser links, and the like. These wireless links may include various mobile communication protocols such as wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like.

The medium used to transmit information in mobile communication links as described above may generally include any communication medium or media that can be accessed by a computing device. Such media may include any processor readable non-transitory storage media. Processor readable media may also include transitory wired and/or wireless communication media, or any combination thereof. Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, and the like. By way of example, communication media includes wireless media such as fluids or space for acoustic, RF, infrared, and other wireless signals, and wired media such as twisted pair, coaxial cable, fiber optics, wave guides, and other wired media.

Data Storage Node(s) 118 and Compute Accelerator Node(s) 116 may comprise multiple computing devices, components of a single computing device, or a single device with multiple software features. In some embodiments, Data Storage Node(s) 118 and/or Compute Accelerator Node(s) 1116 may comprise a cluster of network devices, such that functionality is shared among the network devices of the cluster in a load-balanced and/or parallel processing. In some embodiments, system 100 may include load balancers (not shown) or other network devices that manage the load balancing of tasks among Data Storage Node(s) 118 and/or Compute Accelerator Node(s) 116 respectively.

In some embodiments, Data Storage Node(s) 118 and Compute Accelerator Node(s) 116 may use external data storage for storing data. The stored data may include web sites, databases, log files, online journals (e.g., blogs), photos, reviews, and information regarding online services such as messaging, search, news, shopping, advertising, travel services, or virtually any other type of data. Additionally, in some embodiments, a user of client devices 102-104 may access data and guest application(s) installed on Data Storage Nodes 118 and Compute Accelerator Node 116.

FIG. 2 shows one embodiment of a network device, according to at least one of the embodiments. Network device 200 may include many more, or fewer, components than those shown. The components shown, however, are sufficient to disclose an illustrative embodiment.

Network device 200 may represent, for example, Data Storage Node 118, and Compute Accelerator Node 116 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Windows®, UNIX, or LINUX®, or a specialized mobile communication operating system such as Apple iOS®, Google Android®, Windows Mobile™, the Symbian® operating system, or the like. The operating system may include, or interface with a Java® virtual machine module that enables control of hardware components and/or operating system operations via Java application programs.

Memory 230 can be utilized by network device 200 to store programs, applications, software modules, and the like, as well as the data used by such programs, applications, and/or software modules. Applications may comprise processor executable instructions which can be executed by network device 200. Programs in mass memory 230 may include a browser application 243. Browser 243 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 230 may also include several guest applications (1-N) 248, and Hypervisor 244 application. Memory 230 may further include Data Access application 242 and Compute Accelerator application 246 which enable access to data stored on storage devices.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a Joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 241, and/or programs in memory 230. Interaction with the user interface includes visual interaction via a display coupled to video display adapter 254. The user interface can also include gesture interface 270, touch interface 258, pointing device interface 264, keyboard interface 266, and audio interface 262.

Network device 200 may include removable storage media 252 and stationary storage device(s) 256. Removable storage media 252 can comprise one or more of an optical disc drive, flash memory drive, hard drive, a floppy disk drive, tape drive, and/or any other type of processor readable non-transitory storage media. Stationary storage device 256 or removable storage media 252 may include any method or technology for processor readable non-volatile storage of data, such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 250, network device 200 can communicate with a communication protocol, such as Ethernet and the like, with a wide area network such as the Internet, Cloud Network, a local area network, a wired telephone network, a cellular telephone network, or some other communications network, such as networks 120 and/or carrier network 130 in FIG. 1. Additionally, high bandwidth network interface 268 is provided to enable network device 200 to communicate with other co-located network devices at vastly greater speeds than network interface 250. For example, network device 200 may be physically embodied on a "blade" or card in a chassis that supports the operation of several co-located blades and provides access to a high bandwidth network backplane for the network devices to communicate particular information between each other over high bandwidth network interface 268.

FIG. 3 illustrates an exemplary schematic overview of data cluster 300 which includes four nodes: compute accelerator node 302, and three data storage nodes 304, 306, and 308. Each node is coupled to high bandwidth network backplane 310 which enables low latency, high bandwidth network communication between each node in the cluster. Communication over backplane 310 is separate from communication over a higher latency and relatively lower bandwidth network medium (not shown) such as Ethernet, and the like.

Compute Accelerator node 302 includes data access application 312 and compute accelerator application 314 which are in communication with hypervisor 322 both through application programming interface (API) 316 and through (IPC) 318. Hypervisor is also in communication over backplane 310 with separate hypervisors that are resident on each of the other nodes (304, 306 and 308) through interface bus (IB) 320. A plurality of guest applications 328 are co-resident on node 302 and each are in communication with hypervisor 322 through application programming interface (API) 326. Also, node 302 includes a stationary storage device 324 that is generally employed to service the data storage needs for the guest applications 328, data access applications 312, compute accelerator application 314 and hypervisor 322.

Data storage nodes 304, 306, and 308 are arranged with substantially the same components a compute accelerator node 302 but with some differences. For example, data storage node 308 does not have resident guest applications but it does include a relatively large amount of stationary storage devices that may be employed to provide data storage for guest applications resident on other nodes that may be within or outside cluster 300, along with a resident data access application, a resident compute accelerator application, and a resident hypervisor.

Somewhat similarly to node 308, data storage node 304 includes a relatively large amount of stationary storage devices (although less than node 308) that are employed to provide data storage for a single guest application resident on node 304, other guest applications resident on other nodes within or outside cluster 300, along with a resident data access application, a resident compute accelerator application, and a resident hypervisor.

Also, node 306 is somewhat similar in that it provides relatively less resident stationary storage devices than node 304 but more than node 302 and relatively more resident guest applications than node 304 but less than node 302.

Additionally, over time and depending upon various factors such as latency, load, processing capacity, and the like, all of the nodes may increase or decrease the number of guest applications that are resident on a particular node. Furthermore, backplane 310 may be employed for communication between guest applications that are resident on nodes within cluster 300 instead of a relatively higher latency and lower bandwidth network, such as Ethernet.

Exemplary Flowcharts

FIG. 4 shows process 400 for a Fast Guest Data Path (FGDP) that enables applications running in co-resident Virtual Machines (VMs) to communicate utilizing non-networked communication techniques. Increased performance can be obtained by "short circuiting" the high-latency and/or high overhead network communication protocols if initiating communication between guest applications running on co-resident VMs. Because co-resident VMs are processes running within the same operating system environment (in the hypervisor) on the same physical machine, low latency, low overhead, high speed inter-process communication mechanisms can be employed for improved performance. This can be accomplished by intercepting the communication transaction at the Application Layer of the communication stack which is based on the Open Systems Interconnection (OSI) reference model. If running processes execute Application Layer system calls to initiate network communication, the communication transaction may be intercepted and examined before the computationally expensive protocol overhead occurs. If the communication is targeting a co-resident VM, the transaction can be intercepted and transmitted to the intended application process through the Fast Guest Data Path (FGDP).

The FGDP proxies and marshals the network protocol transaction through low overhead inter-process communication methods, such as Unix Domain Sockets, Shared Memory, Pipes, and the like. FGDP may by enabled by software modules that interface with the host hypervisor by using hypervisor provided API's to facilitate inter-process communication among applications running on co-resident VM's. Or, if the hypervisor does not provide direct support for communication among applications running on co-resident VM's, specialized extensions may be installed on the co-resident VM's in order to enable them to take advantage of the FGDP. Additional techniques of implementing inter-process communication among applications running on co-resident VM's include, providing daughter processes running on the physical machine outside of control of the hypervisor. In this case, the FGDP VM extensions would enable communication with the daughter process to implement the FGDP on the physical machine. It should be appreciated that one of ordinary skill in the art would be able to implement inter-process communication among co-resident VM's in any number of ways.

Figure 4A:
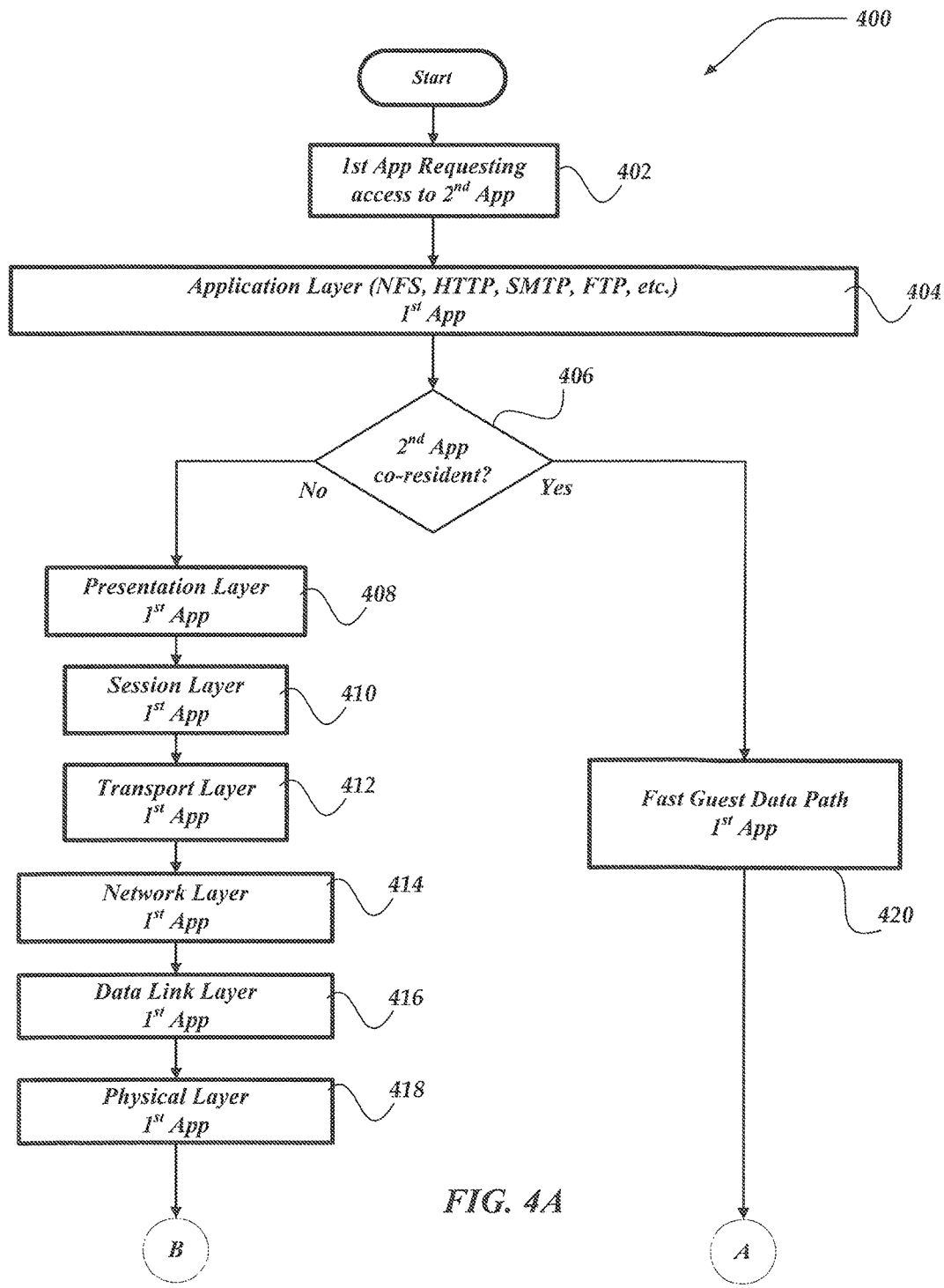
FIGS. 4A and 4B show a flowchart of a process for providing a fast data path for the virtual machine communication layers between guest applications that are co-resident on the same node.
Figure 4B:
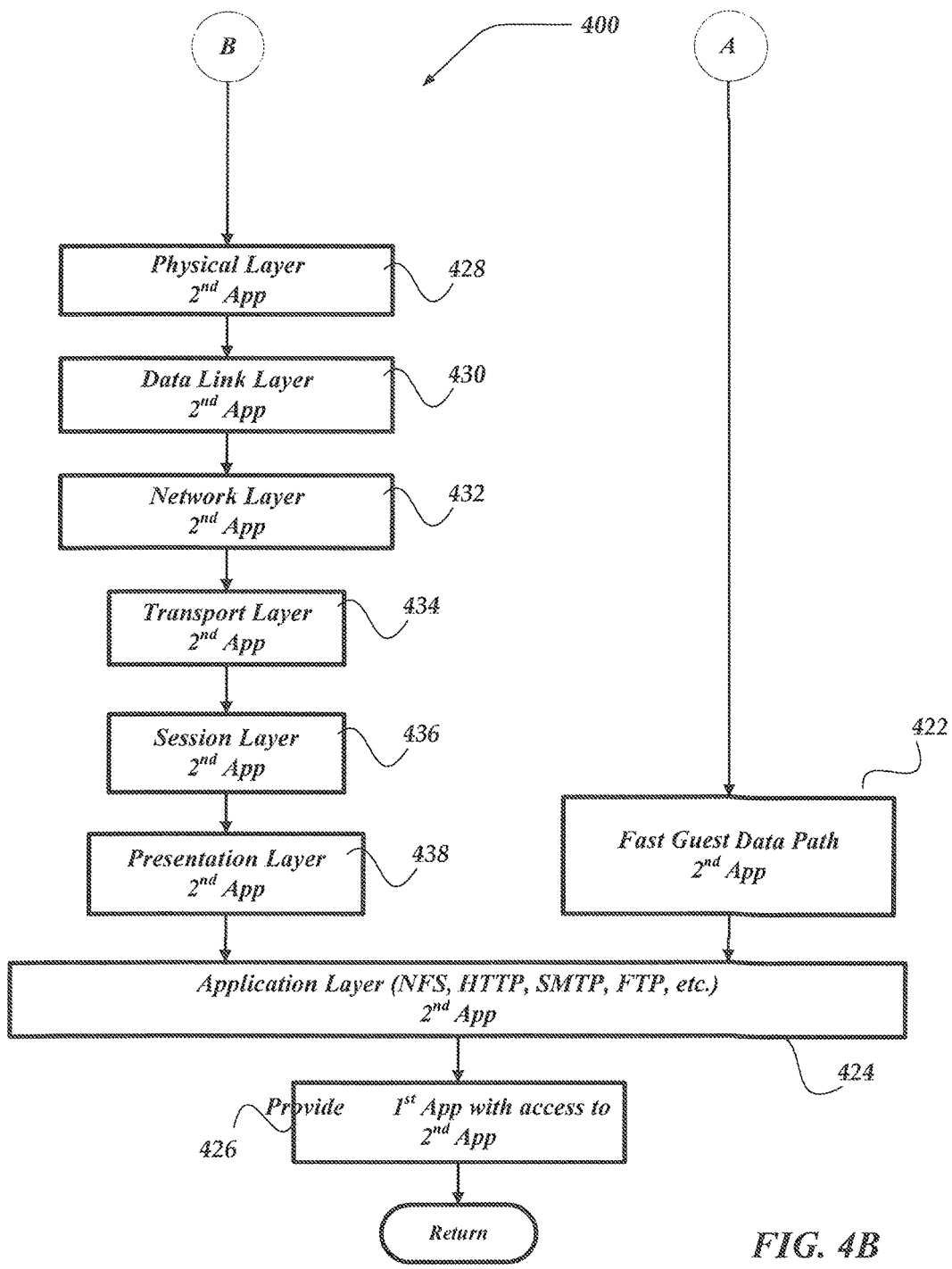

In FIGS. 4A and 4B, moving from the start block, process 400 advances to block 402 where a first guest application running in a Virtual Machine on a node requests access to a second guest application running in its own Virtual Machine. The first guest application that is running as process within it's VM initiates a request to access a second application through standard network communication protocol. In at least a portion of the various embodiments, the request begins at the Application Layer of the OSI communication Stack. For example, opening a file for read that is stored on a Network File System (NFS) drive. The first guest application executes the appropriate system call to open the file for reading. Next, the local operating system parses the path of the file and determines that the file is stored on a NFS drive triggering the NFS system libraries to initiate network communication.

At block 404, the request is passed to the application (top) layer of a seven layer communication protocol stack such as the Open System Interconnection (OSI) reference model. Moving to decision block 406, the process determines if the second guest application is co-resident on the same node as the first guest application. Examples of co-resident guest applications are shown in FIG. 3 for nodes 302 and 306. Also, node 304 illustrates an example of a single guest application, i.e., another guest application is not co-resident.

At decision block 406 a determination is made whether the NFS drive is served by a guest application running on a co-resident VM, or whether the NFS drive is served by another application process running on another physical machine, and the like. Different embodiments may employ different methods to determine whether the second application is a co-resident VM. For example, the parent hypervisor may provide an API interface that enables guest VM's to query the hypervisor for a list of co-resident VM's, or alternatively, each VM may maintain a record of which hosts are co-resident VM's, possibly contained in a configuration file, and the like. In at least some of the various embodiments, the determination at block 406 may be performed in part by at least one of the data access application and the compute accelerator application as shown in FIGS. 2 and 3. Also, access to the stationary data storage devices on the node continues to be managed by the data access application.

If at block 406 it is determined whether the first application is targeting access to a second application running on a different physical machine/node, or the target is not recognized as running on a co-resident VM, then the process moves to block 408 and employs the presentation layer offered by the network communication protocol running on the VM for the first guest application. Next, the process moves down through the other blocks for the communication protocol layers for the VM for the first guest application, e.g., 410 (Session layer), 412 (Transport layer), 414 (Network Layer), 416 (Data Link Layer), and 418 (Physical Layer).

At block 428, the request for access is received from block 418 at the lowest level of the communication stack, such as, the Physical Layer, that corresponds to the VM for the second guest application. Then the communication transaction continues, with the first guest application's request for access working its way up through multiple layers of communications protocol layers running in the corresponding VM for the second guest application, e.g., 430 (Data Link Layer), 432 (Network Layer), 434 (Transport Layer), 436 (Session Layer), 438 (Presentation Layer), and 424 (Application Layer).

At block 426, the first guest application's request is received from block 426 and provided to the second guest application for further processing. Next, the process returns to performing other actions, such as a response from the second guest application to the request received from the first guest application.

Additionally, if the process determined that the second guest application running on another node is within the same data cluster as the node for the first guest application, then the request is communicated to the other node over a high bandwidth low latency network communication backplane instead of a relatively lower bandwidth communication network such as Ethernet. Alternatively, if the process determines that the second guest application running on another node is not within the same data cluster as the node for the first guest application, then the request is provided to the other node over a relatively low bandwidth communication network such as Ethernet.

Alternatively, if at decision block 406 it is determined that the first application is requesting access to a second application that is both running in a separate Virtual Machine and co-resident on the same node (physical machine), the process is diverted away from the standard communication protocol layers of blocks 408, 410, 412, 414, 416, and 418. Instead, the process flows to block 420 where Fast Guest Data Path (FGDP) processing is employed to forward the request directly to the application layer of the Virtual Machine for the co-resident second application. The FGDP process employs low-overhead inter-process communication methods to bypass the communication layers below the Application Layers for the Virtual Machines of both the first guest application and second guest application.

Also, in various embodiments, the FGDP process may intercept the communication between co-resident guest applications below the Application Layer. For, example, at least one embodiment may test if FGDP processing is available for communication between co-resident guest applications at a lower level of the OSI stack, such as, within the Transport Layer. Further, at least one embodiment may test whether the FGDP processing is available at multiple levels of the OSI stack, and bypass the layers below the highest determined layer with access to the FGDP process.

At block 422, FGDP processing for the second guest application receives from FGDP processing at block 420 the request from the first guest application. At block 424, the first guest application's request is provided at the application layer of the OSI stack of the VM for second guest application. Next, at block 426, the process provides the first guest application's request to the second guest application for further processing. Next, the process returns to performing other actions.

Generally, each guest application running with its own VM is listening at the application layer for requests from other guest applications. For example, a guest application may be a web server listening for HTTP requests at the application layer. Since guest applications are generally listening for requests at the application layer, the FGDP processing is transparent to the operation of the co-resident guest applications. Additionally, in at least some of the various embodiments, if the second guest application responds to the first guest application, the processing is generally reversed in substantially the same manner as the request from the first guest application was originally processed.

Additionally, in at least some of the various embodiments, the FGDP processing at block 420 and block 422 may be performed in part by at least one of the data access application and the compute accelerator application at the node as shown in FIGS. 2 and 3.

Figure 5:
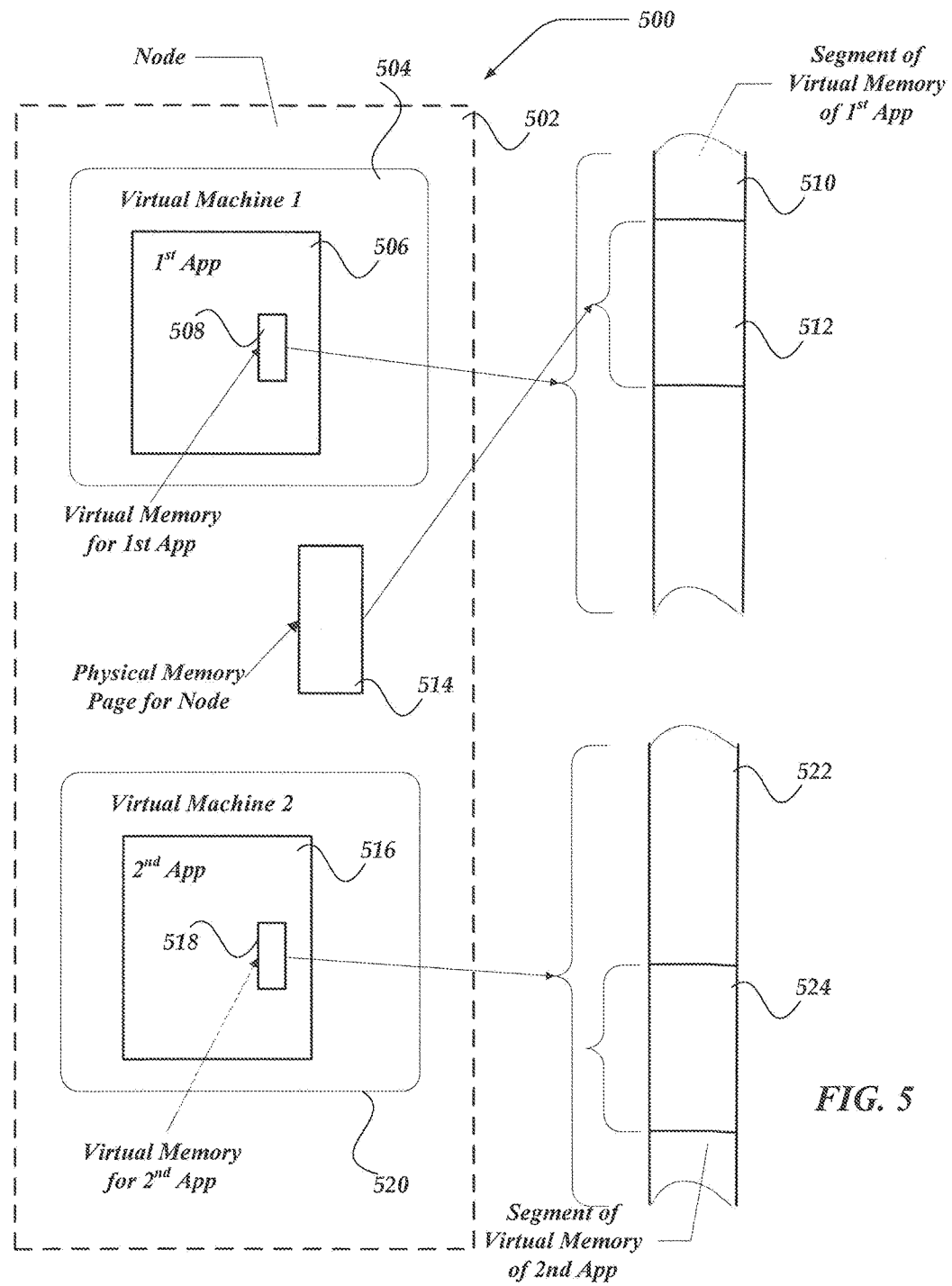
FIG. 5 illustrates a schematic for sharing a physical page of memory in the virtual machine memory of co-resident guest applications that are running on the same node.

FIG. 5 shows a schematic 500 for co-resident guest applications to avoid computationally expensive copying actions at their commonly shared node 502. Schematic 500 illustrates a low-overhead inter-process communication method for the VMs for corresponding guest applications to share access to physical memory pages at node 502. First VM 504 includes first guest application 506 and further includes a corresponding virtual memory 508. Second VM 520 includes second guest application 516 and further includes a corresponding virtual memory 518. Also, node 502 includes a plurality of physical memory pages, but for clarity in the schematic just one of those physical memory pages 514 is shown.

Schematic 500 also illustrates an expanded portion (segment 510) of virtual memory for the first guest application, and further shows an expanded portion (segment 522) of virtual memory for the second guest application. Instead of copying physical memory page 514 into the virtual memory of either of the guest application, a pointer to the physical memory page is copied to either location 512 within segment 510 (shown) or location 524 within segment 522. In this way, the virtual machines can either simultaneously share access or transfer access to the physical memory page for processing by their corresponding guest applications without having to copy the entire physical memory page from the node into each of the virtual memories for their respective guest applications.

Figure 6:
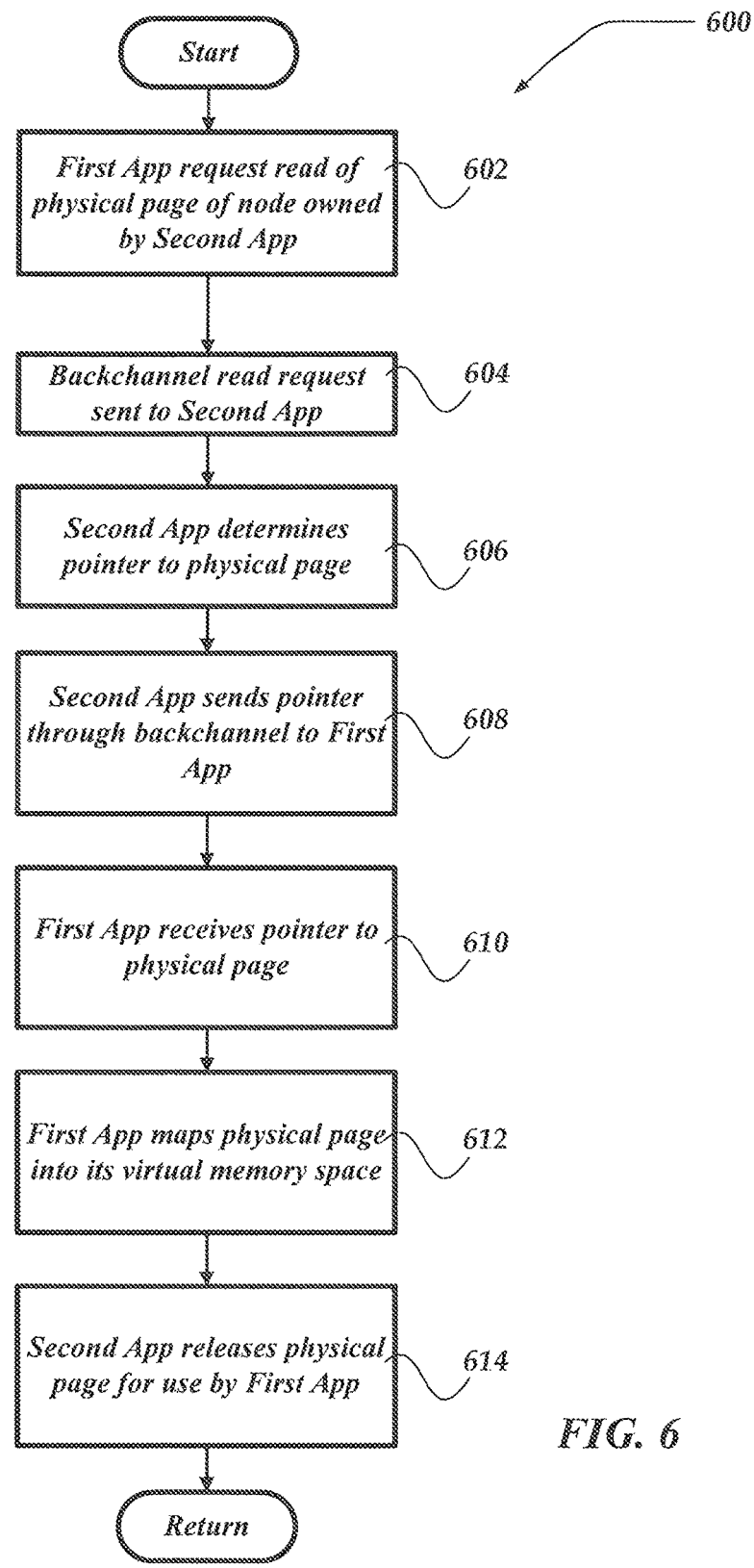
FIGS. 6-7 show flow charts for processes for sharing a physical page of memory in the virtual machine memory of co-resident guest applications that are running on the same node, in accordance with the various embodiments.

FIG. 6 illustrates a low-overhead inter-process communication process 600 for a first guest application running in a VM that requests access and control of data from a co-resident second guest application running in a separate VM. Moving from a start block, the process advances to block 602 where the first guest application sends a request to read data in a physical page(s) of memory that is owned/controlled by the second guest application. At block 604, a backchannel process, such as the FGDP, requests access to that particular data that is controlled by the second guest application. At block 606, rather than making a copy of the requested data and returning the copy to the requesting first guest application, the second guest application determines a pointer to the physical memory page(s) where the requested data is stored.

Next, at block 608, the second guest application returns this pointer to the requesting first application by way of the backchannel process. At block 610, the requesting first guest application receives the pointer to the physical memory page(s). At block 612, the first guest application maps the pointer into the virtual memory space for the first guest application. At block 614, the second guest application releases ownership of the requested physical memory page. The physical page(s) of memory is now part of the requesting first guest application's virtual memory space without having to provide a high-overhead computation copy of the data previously controlled by the second guest application. Next, the process returns to performing other actions.

Figure 7:
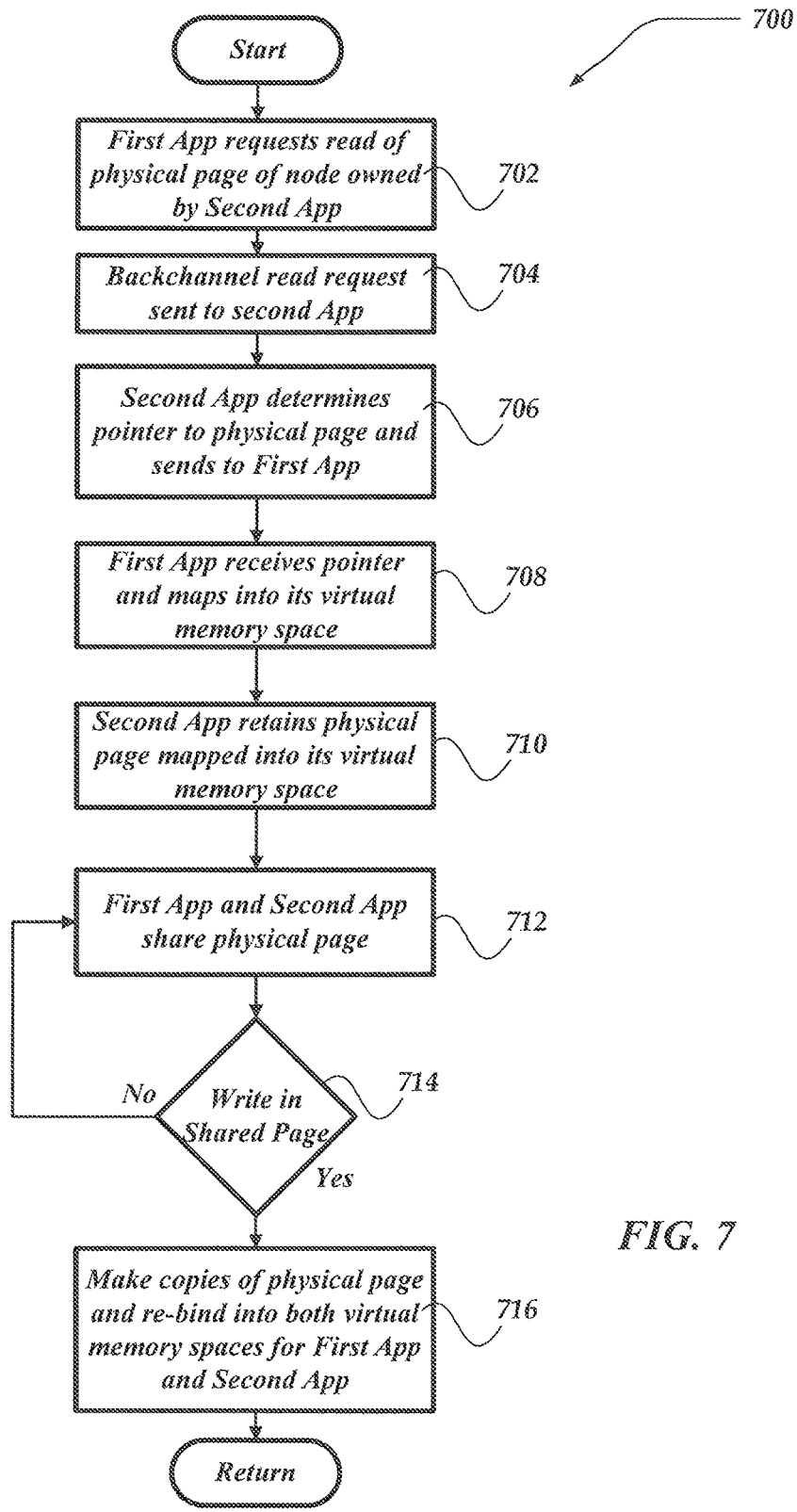

FIG. 7 illustrates a low-overhead inter-process communication process 700 for a first guest application running in a VM that requests shared access to data controlled by a co-resident second guest application running in another VM. Moving from a start block, the process flows to block 702 where the first guest application makes a request for data in a physical page(s) of memory that is owned/controlled by the second guest application. At block 704, a backchannel process, such as the FGDP, requests access to that particular data that is controlled by the second guest application. At block 706, rather than making a copy of the requested data and returning the copy to the requesting first guest application, the second guest application determines a pointer to the physical memory page(s) where the requested data is stored. The second guest application returns this pointer to the requesting first application by way of the backchannel process. At block 708, the requesting first guest application receives the pointer to the physical memory page(s) and maps the pointer into the virtual memory space for the first guest application. At block 710, the second guest application retains ownership of the requested physical memory page which is still mapped into the virtual memory space for the second guest application.

Next, at block 712, the first and second guest applications share ownership of the data in the physical page(s) of memory. Both, the first and second guest applications running in different co-resident VM's continue to execute while sharing the data in the physical page(s) of memory.

At decision block 714, if it is detected that a write operation is attempted by either the first or second guest application into the data of the shared physical page(s) of memory, the process flows to block 716 where the shared memory page(s) are subsequently copied into each of the virtual memories of the virtual machines for each of the first and second guest applications. Also, the sharing of the physical page of memory may be terminated for one or both of the first and second guest applications. The data in the physical page(s) of memory is now part of the requesting first guest application's virtual memory space and the second guest application's virtual memory space. Next, the process returns to performing other actions. Alternatively, if the determination at decision block 714 had been negative, the process would have looped back to block 712 until the determination at block 714 was affirmative.

Figure 8:
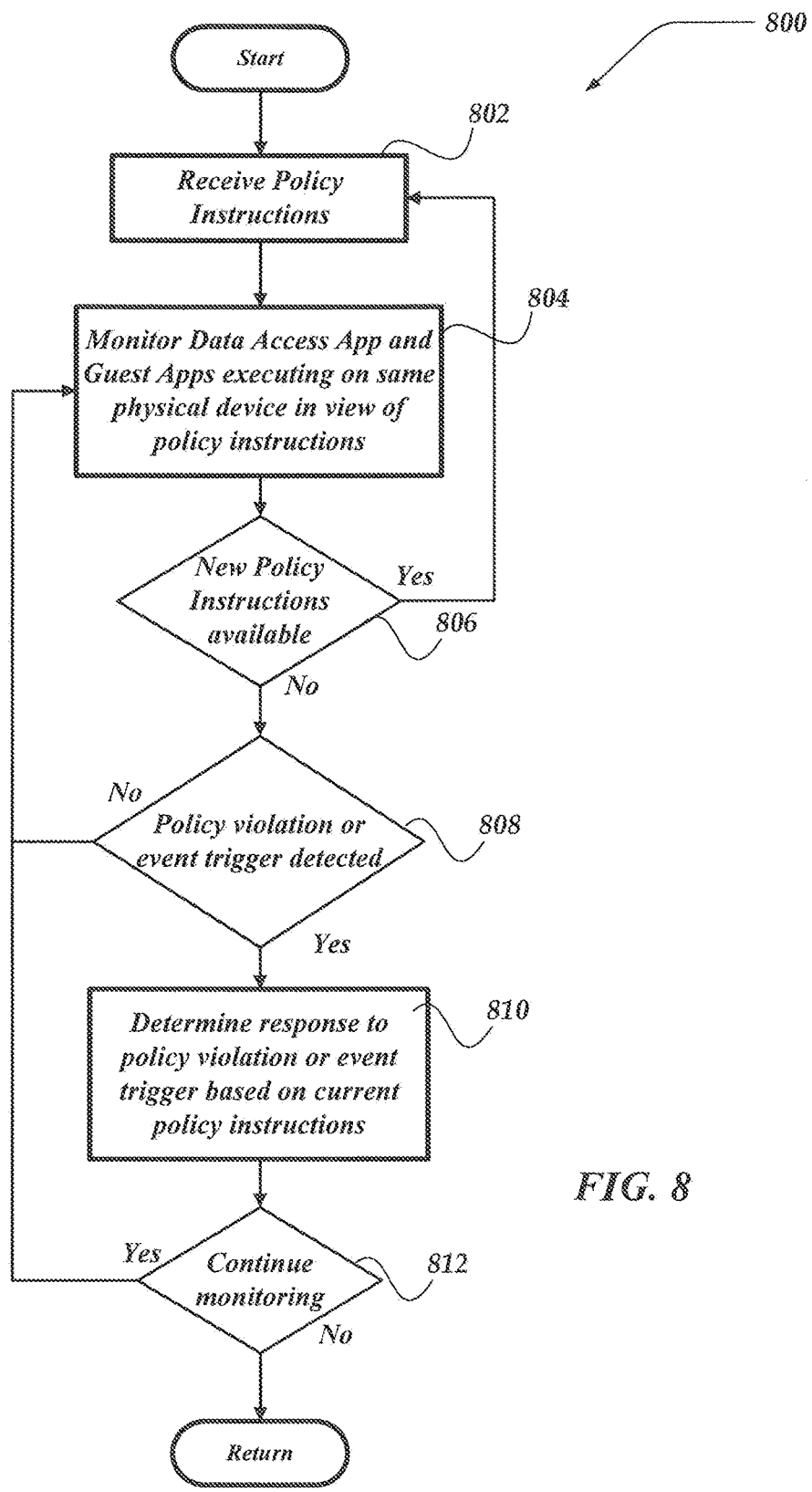
FIG. 8 shows a flow chart for a process for monitoring co-resident guest applications that are running on the same node, in accordance with the various embodiments.

FIG. 8 illustrates, for at least one of the various embodiments, a process 800 for monitoring a computing node to determine if is operating in compliance with the current policy instructions. Moving from a start block, the process flows to block 802 where the process receives the current policy instructions. Policy instructions may be received in a file in a format such as, extensible markup language (XML), yet another markup language (YAML), comma separated values (CSV), java script object notation (JSON), INI files, and the like. Further, in at least one of the various embodiments, policy instructions may be retrieved from a remote or local database, retrieved by using, XML-RPC, SOAP, HTTP, FTP, and the like. Additionally, operators and administrators may set policy instructions using a graphical user-interface, command-line interface, and the like.

In at least one of the various embodiments, policy instructions may include defining computing resource utilization thresholds for various classes of applications. For example, a policy instruction may establish a maximum processor/processing utilization for co-resident guest applications. Generally, policy instructions may be defined to set lower and upper bounds for all measurable computing resource parameters, such as, resident memory, virtual memory, total processing time, idle time, number of threads, age, page faults, I/O, persistent storage, locks acquired, and the like. Further, In at least one of the various embodiments, policy instructions may be arranged to trigger events when defined thresholds or boundaries have reached. Events may be arranged to trigger one or more of the following actions: the writing of data and messages to a log file, execute a script or program, display a message or event indicator on the user-interface, send notifications to interested parties, initiate migration of guest applications, and the like.

Next, at block 804 the process begins monitoring computing resource parameters of co-resident data access applications and guest applications in view of the current policy instructions.

Next at decision block 806, the process checks if new policy instructions may be available. If the process determines that new policy instructions are available, the process may flow back to block 802 to receive the new policy instructions. If new policy instructions are not available the process may continue to decision block 808 and to determine whether the current policy instructions have been violated or if the current policy instructions require an event to be triggered. If there are no policy violations or events triggered the process may flow back to block 804 to continue monitoring the co-resident data access applications and guest applications. If the process determines that a policy violation or an event has been triggered the process may flow to block 810.

At block 810, the process may determine an appropriate response to the determined policy instruction violation or event trigger based on the current policy instructions.

Next, at decision block 812, if the process determines that monitoring should continue the process flows to block 804, otherwise the process returns control the calling process or returns to performing other actions.

Figure 9:
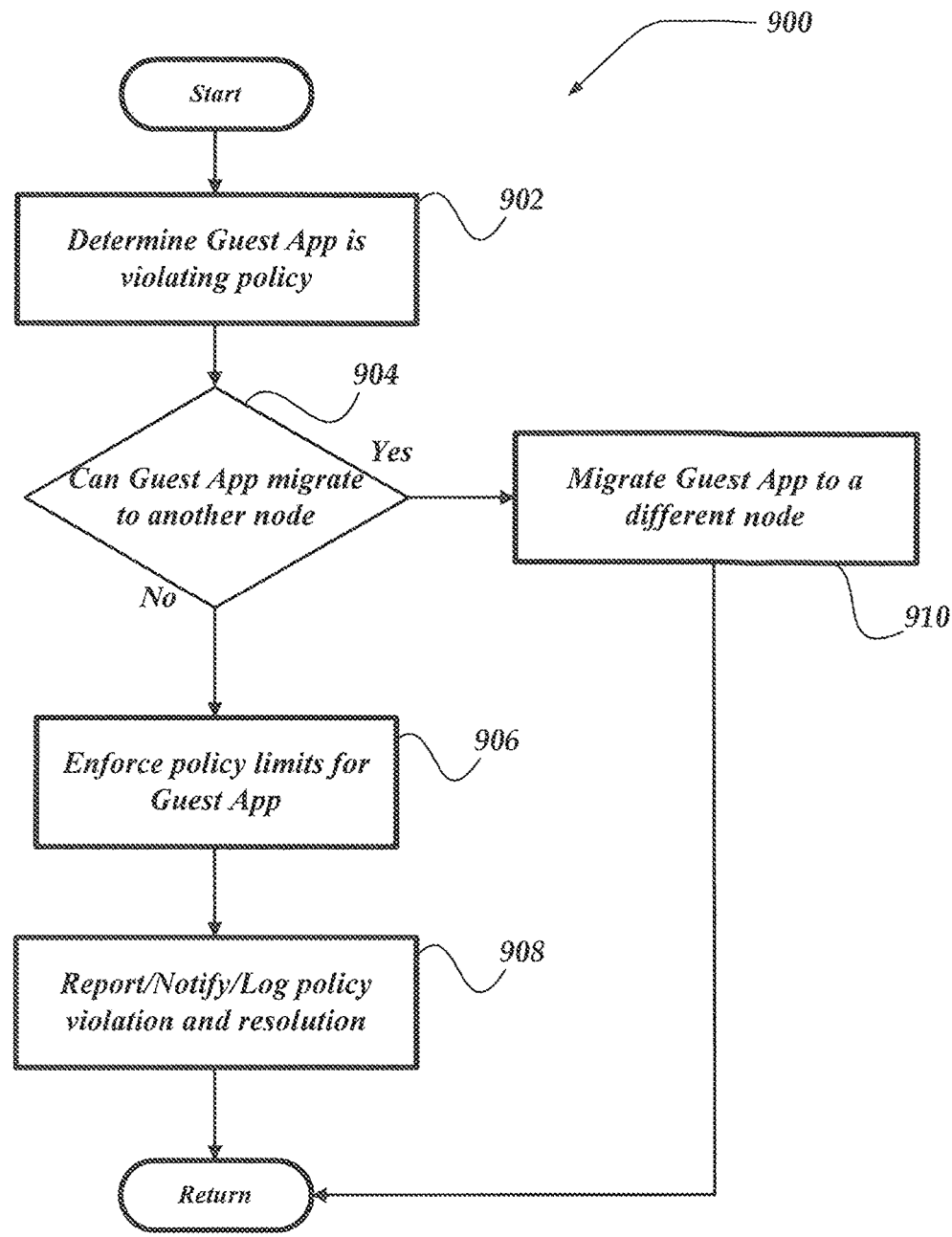
FIG. 9 shows a flow chart for a process for enforcing policy instructions for guest applications that are running on a monitored node, in accordance with the various embodiments.

FIG. 9, illustrates for at least one of the various embodiments, a process 900 determining the appropriate response after a guest application has been determined to be in violation of current policy instructions. After a start block the process flows to block 902 where it may be determined that a guest application has violated a policy governed by the current policy instructions.

Next, at decision block 904, a process may investigate whether, based in part on the current policy instructions, the non-compliant guest application may be migrated to another node within the cluster. If so, the process flows to block 910 and the non-compliant guest application may be migrated to another node within the cluster.

If the process determines that the non-compliant guest application may not be migrated to another node within the cluster, the process flows to block 906 and enforces the current policy instructions on the non-compliant guest application bringing it into compliance, e.g., limit or throttle computing resources that may be utilized by the not yet migrated non-compliant guest application.

Next, at block 908, the process reports the policy violation and the resolution, if any. Next, the process returns control to the calling process or returns to performing other actions.

Figure 10:
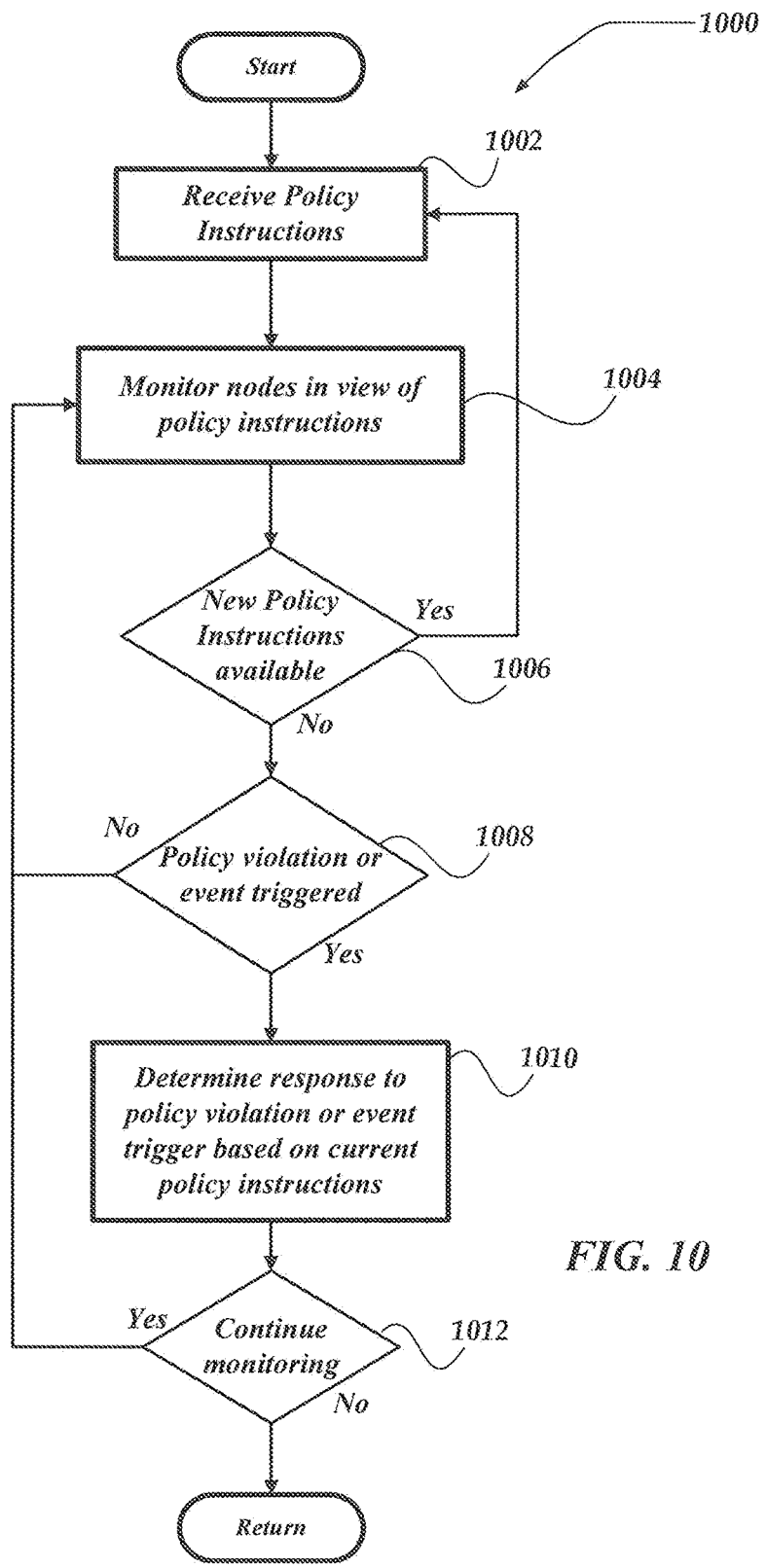
FIG. 10 shows a flow chart for a process for monitoring nodes operating in a cluster, in accordance with the various embodiments.

FIG. 10, shows a process 1000, in at least one of the various embodiments, where at least one or more data access applications are arranged to monitor two or more computing devices arranged into a cluster of nodes. Moving from a start block, at block 1002 the process receives the current policy instructions for the monitored cluster of nodes.

Next, at block 1004, the process monitors nodes within the cluster in view of the current policy instructions. At, decision block 1006, the process checks if new policy instructions are available. If there are new policy instructions available the process flows to block 1002 and receives the new policy instructions. Otherwise, if no new policy instructions are available the process flows to decision block 1008 and determines whether the monitoring process has detected a violation of the current policy instructions or if an event has been triggered. If neither a violation of the current policy instruction is detected nor an event triggered the process may flow to block 1004 to continuing monitoring the cluster.

If the monitoring process has detected a violation of the current policy instructions or an event has been triggered, the process continues to block 1010 to determine the appropriate response to the violation of the current policy instructions or event trigger based on the current policy instructions.

Next, at decision block 1012, if the process determines that monitoring of the cluster should continue the process flows to block 1004, otherwise the process returns control to the calling process or returns to performing other actions.

Figure 11:
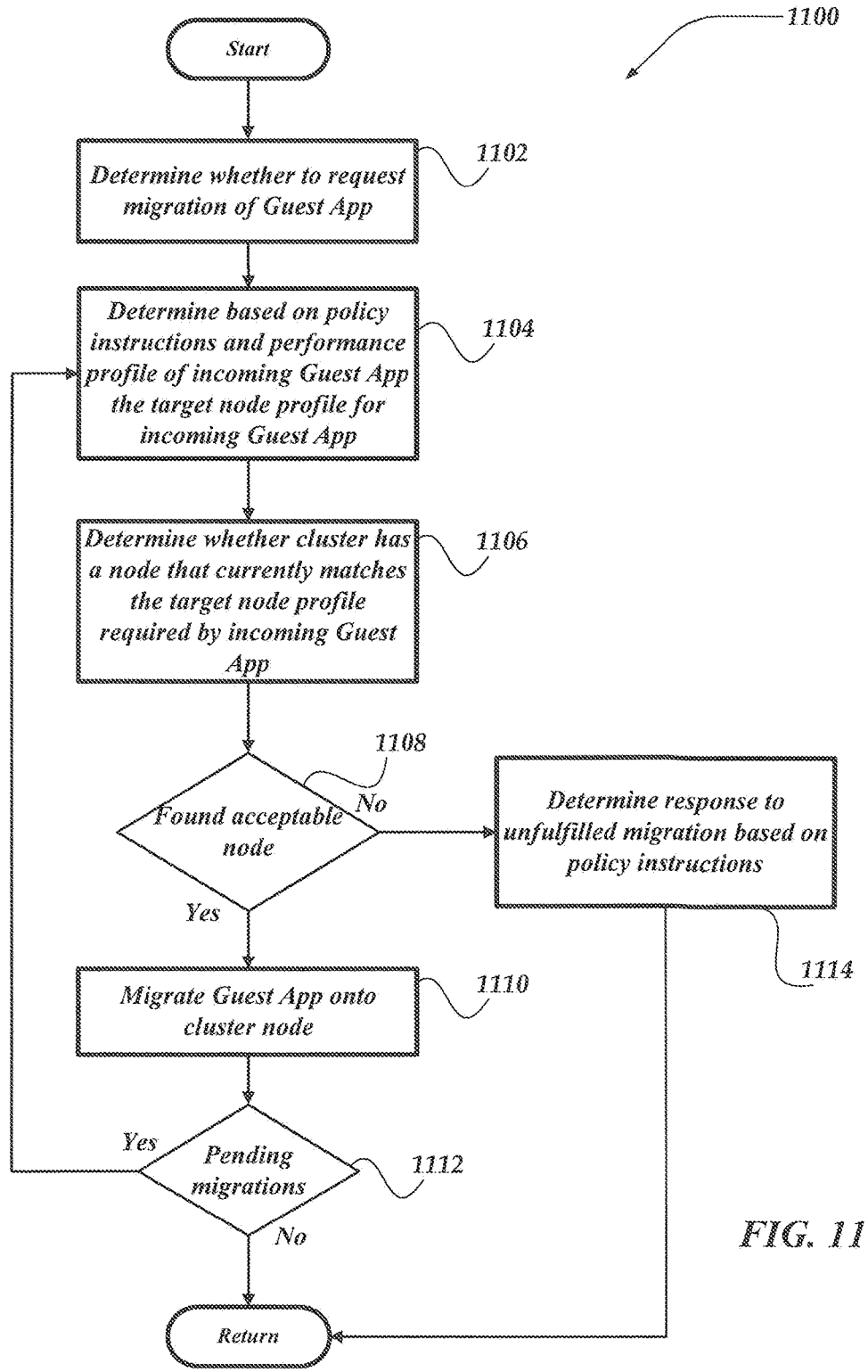
FIG. 11 shows a flow chart for a process for migrating guest applications among nodes operating in a cluster, in accordance with the various embodiments.

FIG. 11, shows for, at least one of the various embodiments, a process 1100 that may be performed by a data access application to determine whether to migrate an incoming or resident guest application to another node in a cluster, and if so, determines which node within the cluster to migrate the guest application to.

Moving from a start block, the process flows to block 1102 where the process determines whether to request migration of an incoming or existing guest application to another (target) node within the cluster.

Next, at block 1104 the process determines a target node performance profile to accommodate the guest application that is a candidate for migration based on the current policy instructions and a performance profile for the guest application.

After the target node performance profile is determined for the guest application, the process flows to block 1106 and surveys the cluster to determine whether the cluster includes a target node within the cluster that has available computing resources to fulfill the target node performance profile required by the migrating guest application. At decision block 1108, if the process is unable to find an acceptable target node, the process flows to block 1114 and determines the appropriate response to an unfilled migration based on the current policy instructions, e.g., limit or throttle computing resources that may be utilized by the not yet migrated guest application. Alternatively, if an acceptable target node within the cluster is identified, the process flows to block 1110.

At block 1110, the process performs actions to migrate the guest application to the identified acceptable target node within the cluster.

Next, at decision block 1112, if there are additional pending migrations of guest applications, the process flows to block 1104 and performs substantially the same actions described above. Otherwise, the process returns control to the calling process or returns to performing other actions.

Figure 12:
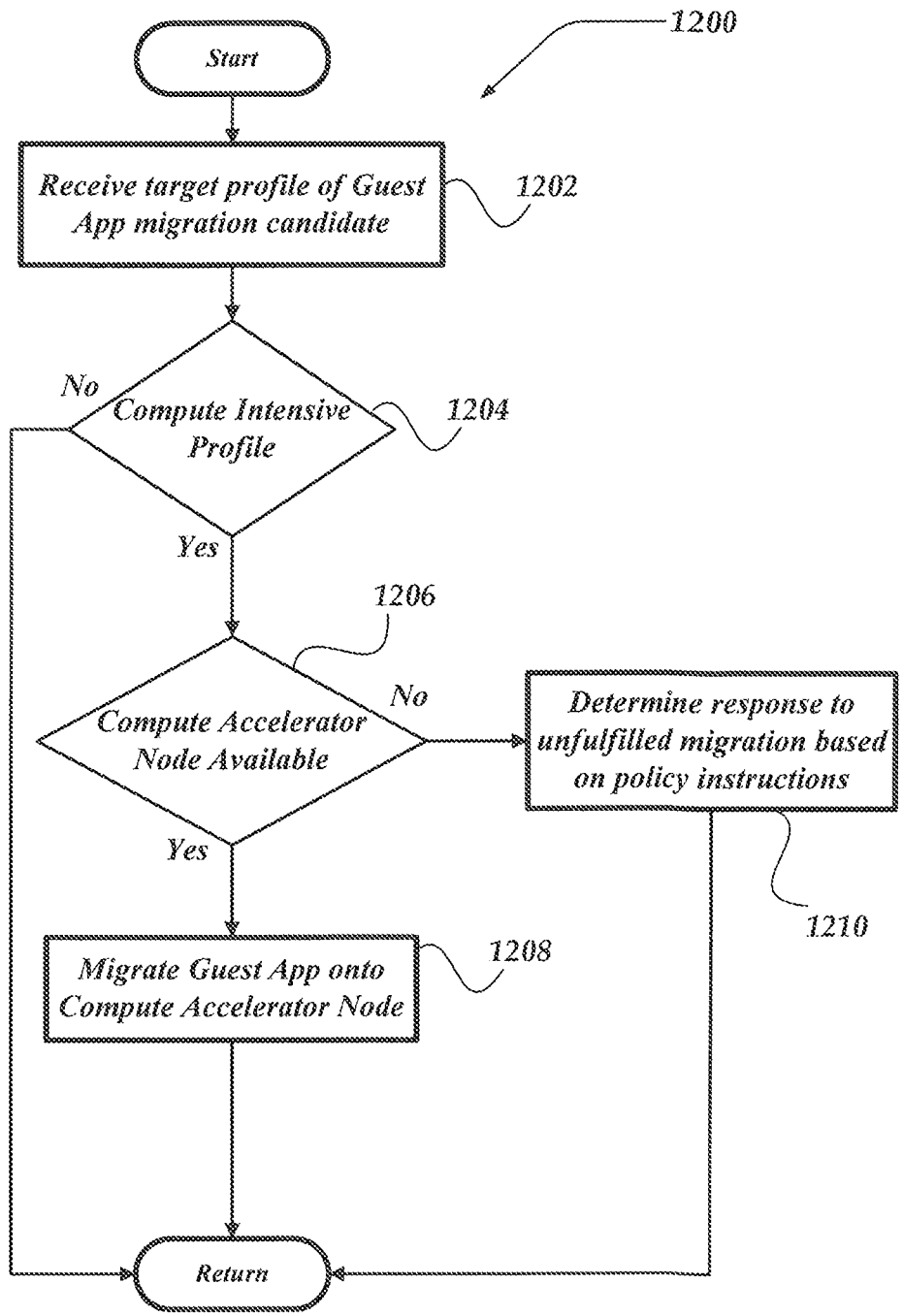
FIGS. 12-14 show flow charts for processes for migrating guest applications to computing appliances based in part on computing appliances' profiles.

FIG. 12 illustrates a process 1200 for migrating one or more guest applications to a compute accelerator node computing appliance. After a start block the process begins.

At block 1202 the process may receive the application profile of the guest application that may be a candidate for migration. At decision block 1204, if the process determines that the guest application may have an application profile that indicates that a compute accelerator node computing appliance may be appropriate as a target node, then the process advances to decision block 1206. Otherwise, the process returns control to the calling process.

At decision block 1206, the process may determine if there is one or more compute accelerator node computing devices available that may accommodate the guest application migration candidate. If the process determines that there is one or more compute accelerator node computing appliances that may accommodate the migration candidate, then at block 1208, the process may migrate the guest application onto a compute accelerator node computing appliance. Otherwise, at block 1210, the process may determine the appropriate response to the unfulfilled migration based on the current policy instructions, e.g., limit or throttle computing resources that may be utilized by the not yet migrated guest application. Finally, the process may return control to the calling process.

Figure 13:
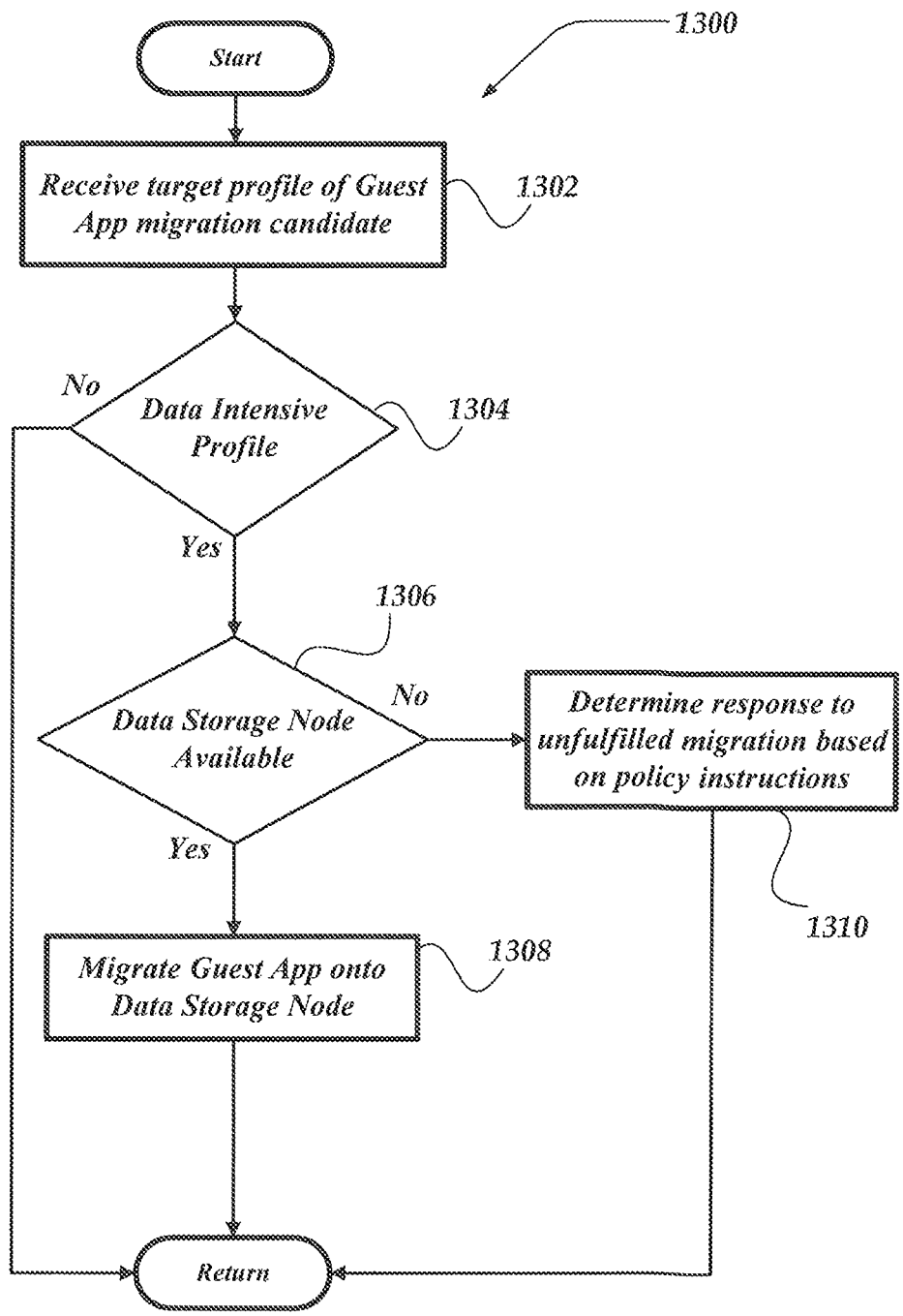

FIG. 13 illustrates a process 1300 for migrating a guest application to a data storage node computing appliance. After a start block the process begins. At block 1302 the process may receive the application profile of the guest application that may be a candidate for migration. At decision block 1304, if the process determines that the guest application may have an application profile that indicates that a data storage node computing appliance may be appropriate, then the process advances to decision block 1306. Otherwise, the process returns control to the calling process.

At decision block 1306, the process may determine if there are one or more data storage node computing appliances available that may accommodate the guest application migration candidate. If the process determines that there is one or more data storage node computing appliances that may accommodate the migration candidate then at block 1308, the process may migrate the guest application onto the determined data storage node computing appliance. Otherwise, at block 1310, the process may determine the appropriate response to the unfulfilled migration based on the current policy instructions, e.g., limit or throttle computing resources that may be utilized by the not yet migrated-guest application. Next, the process may return control to the calling process.

Figure 14:
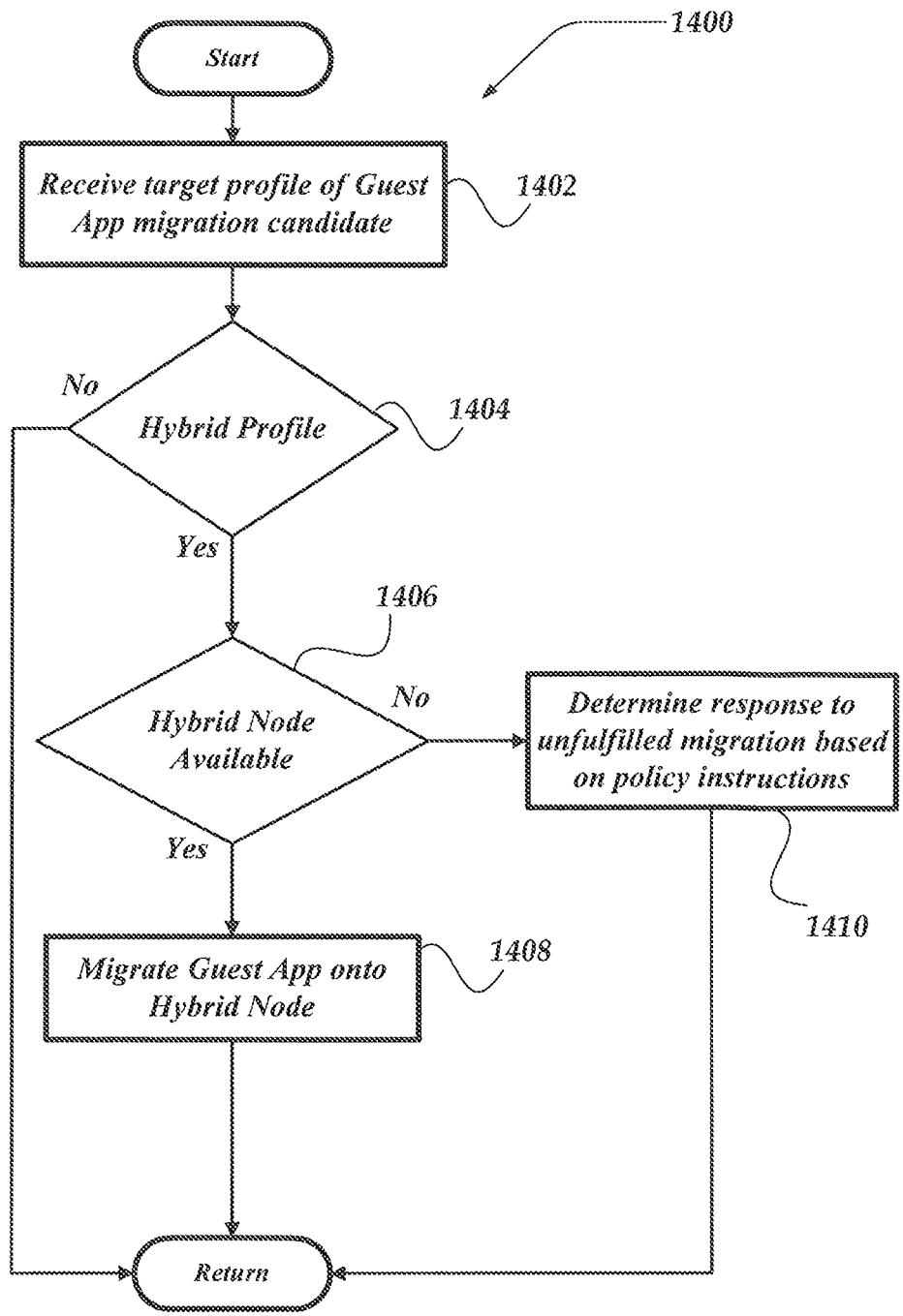

FIG. 14 illustrates a process 1400 for migrating a guest application to a hybrid node computing appliance. After a start block the process begins. At block 1402 the process may receive the application profile of the guest application that may be a candidate for migration. At decision block 1404, if the process determines that the guest application may have a profile that indicates that a hybrid node computing appliance may be required the process advances to decision block 1406, otherwise the process returns control to the calling process.

At decision block 1406, the process may determine if there are one or more hybrid node computing appliances available to accommodate the guest application migration candidate. If the process determines that there is one or more hybrid node computing appliances that may accommodate the migration candidate then at block 1408, the process may migrate the guest application onto the determined hybrid node computing appliance. Otherwise, at block 1410, the process may determine the appropriate response to the unfulfilled migration based on the current policy instructions, e.g., limit or throttle computing resources that may be utilized by the not yet migrated-guest application. Finally, the process may return control to the calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, and the like.

What is claimed as new and desired to be protected by Letters Patent of the United States is:

1. A method comprising:

Maintaining a data storage cluster of nodes wherein nodes among the data storage cluster of nodes are interconnected by a network backplane;

Monitoring a guest application executing on a physical machine that is not a part of the data storage cluster of nodes for compliance with a policy, wherein the policy is based at least in part on a front side bandwidth and a performance profile wherein the front side bandwidth indicates the amount of data the guest application is pulling from the data storage cluster of nodes;

In response to the guest application being non-compliant with the policy, wherein non-compliance is based at least in part on the front side bandwidth reaching an efficiency threshold:

Determining an application type for the guest application wherein types of applications include at least a compute intensive application, a data storage intensive application, and a hybrid application, wherein the computing resource utilization associated with the compute intensive application indicates high utilization of processors, high disk access, and a large memory footprint, wherein the computing resource utilization associated with the data storage intensive application indicates substantial non-local data storage access activity;

determining a target node among the data storage cluster of nodes based on at least one of the application type and the performance profile;

migrating the guest application to the target node;

enforcing the policy on the guest application on the target node;

determining if the guest application is in compliance with the policy on the target node; and reporting at least one of the policy violation and a policy resolution.

2. The method of claim 1, wherein the target node is one of a data storage node, a compute accelerator node, and a hybrid node that includes at least a portion of a capability for each of the data storage node device and the compute accelerator node device.

3. The method of claim 2, wherein the data storage node further comprises additional data storage devices for utilization by the application.

4. The method of claim 2, wherein the compute accelerator node further comprises additional processing devices for utilization by the application.

5. The method of claim 1, further comprising:

In response to migrating the guest application to the target node, monitoring computing resources utilized by each node device in the data storage cluster of nodes;

if the monitoring identifies the target node does not fulfill the performance profile for the guest application and another node in the data storage cluster of nodes is available to fulfill the performance profile for the guest application migrating the application to the another node.

6. An apparatus for improving computing resource utilization for a data storage cluster of nodes interconnected by a network backplane, comprising:

a memory device for storing data and instructions;

a data storage device for storing data and instructions; and a processor for executing instructions that perform actions, including:

Monitoring a guest application executing on a physical machine that is not a part of the data storage cluster of nodes for compliance with a policy, wherein the policy is based at least in part on a front side bandwidth and a performance profile wherein the front side bandwidth indicates the amount of data the guest application is pulling from the data storage cluster of nodes;

In response to the guest application being non-compliant with the policy, wherein non-compliance is based at least in part on the front side bandwidth reaching an efficiency threshold:

Determining an application type for the guest application wherein types of applications include at least a compute intensive application, a data storage intensive application, and a hybrid application, wherein the computing resource utilization associated with the compute intensive application indicates high utilization of processors, high disk access, and a large memory footprint, wherein the computing resource utilization associated with the data storage intensive application indicates substantial non-local data storage access activity;

determining a target node among the data storage cluster of nodes based on at least one of the application type and the performance profile;

migrating the guest application to the target node;

enforcing the policy on the guest application on the target node;

determining if the guest application is in compliance with the policy on the target node; and reporting at least one of the policy violation and a policy resolution.

7. The apparatus of claim 6, wherein the target node is one of a data storage node, a compute accelerator node, and a hybrid node that includes at least a portion of a capability for each of the data storage node device and the compute accelerator node device.

8. The apparatus of claim 7, wherein the data storage node further comprises additional data storage devices for utilization by the application.

9. The apparatus of claim 7, wherein the compute accelerator node further comprises additional processing devices for utilization by the application.

10. The apparatus of claim 6, further comprising the actions of:

In response to migrating the guest application to the target node, monitoring computing resources utilized by each node device in the data storage cluster of nodes;

if the monitoring identifies the target node does not fulfill the performance profile for the guest application and another node in the data storage cluster of nodes is available to fulfill the performance profile for the guest application migrating the application to the another node.

11. A processor readable non-transitory storage media that includes instructions thereon wherein the execution of the instructions by a processor causes actions, comprising:

Maintaining a data storage cluster of nodes wherein nodes among the data storage cluster of nodes are interconnected by a network backplane;

Monitoring a guest application executing on a physical machine that is not a part of the data storage cluster of nodes for compliance with a policy, wherein the policy is based at least in part on a front side bandwidth and a performance profile wherein the front side bandwidth indicates the amount of data the guest application is pulling from the data storage cluster of nodes;

In response to the guest application being non-compliant with the policy, wherein non-compliance is based at least in part on the front side bandwidth reaching an efficiency threshold:

Determining an application type for the guest application wherein types of applications include at least a compute intensive application, a data storage intensive application, and a hybrid application, wherein the computing resource utilization associated with the compute intensive application indicates high utilization of processors, high disk access, and a large memory footprint, wherein the computing resource utilization associated with the data storage intensive application indicates substantial non-local data storage access activity;

determining a target node among the data storage cluster of nodes based on at least one of the application type and the performance profile;

migrating the guest application to the target node;

enforcing the policy on the guest application on the target node;

determining if the guest application is in compliance with the policy on the target node; and reporting at least one of the policy violation and a policy resolution.

12. The media of claim 11, wherein the target node is one of a data storage node, a compute accelerator node, and a hybrid node that includes at least a portion of a capability for each of the data storage node device and the compute accelerator node device.

13. The media of claim 12, wherein the data storage node further comprises additional data storage devices for utilization by the application.

14. The media of claim 12, wherein the compute accelerator node further comprises additional processing devices for utilization by the application.

15. The media of claim 11, further comprising the actions of:

In response to migrating the guest application to the target node, monitoring computing resources utilized by each node device in the data storage cluster of nodes;

if the monitoring identifies the target node does not fulfill the performance profile for the guest application and another node in the data storage cluster of nodes is available to fulfill the performance profile for the guest application migrating the application to the another node.

* * * * *